US012657463B2

(12) United States Patent
Ladevie et al.

(10) Patent No.: US 12,657,463 B2
(45) Date of Patent: Jun. 16, 2026

(54) MULTIPLE LOCALLY STORED ARTIFICIAL NEURAL NETWORK COMPUTATIONS

(71) Applicant: XILINX, INC., San Jose, CA (US)

(72) Inventors: Stephane Ladevie, Villejuif (FR); Ludovic Larzul, El Dorado Hills, CA (US); Sebastien Delerse, Brétigny sur orge (FR); Frederic Dumoulin, Magny-les-hameaux (FR)

(73) Assignee: XILINX, INC., San Jose, CA (US)

( * ) Notice: Subject to any disclaimer, the term of this patent is extended or adjusted under 35 U.S.C. 154(b) by 798 days.

(21) Appl. No.: 16/660,070

(22) Filed: Oct. 22, 2019

(65) Prior Publication Data

US 2021/0117800 A1     Apr. 22, 2021

(51) Int. Cl.
| | |
|---|---|
| *G06N 20/00* | (2019.01) |
| *G06F 9/30* | (2018.01) |
| *G06N 3/082* | (2023.01) |
| *G06N 5/046* | (2023.01) |

(52) U.S. Cl.
CPC ........... *G06N 3/082* (2013.01); *G06F 9/3004* (2013.01); *G06N 5/046* (2013.01); *G06N 20/00* (2019.01)

(58) Field of Classification Search
CPC ........ G06N 3/082; G06N 20/00; G06N 5/046; G06F 9/3004
See application file for complete search history.

(56) References Cited

U.S. PATENT DOCUMENTS

| | | | | |
|---|---|---|---|---|
| 11,054,997 | B2 * | 7/2021 | Murphy ................. | G06N 3/045 |
| 2016/0358099 | A1 * | 12/2016 | Sturlaugson ........... | G06N 5/043 |
| 2019/0279114 | A1 * | 9/2019 | Deshpande ............ | G06N 20/00 |

OTHER PUBLICATIONS

Dessouky, G., et al, Adaptive Dynamic On-Chip Memory Management for FPGA-based Reconfigurable Architectures, Retrieved from Internet:<https://ieeexplore.ieee.org/abstract/document/6927471>(Year: 2014).*

Vranjkovic', V. et al, Hardware acceleration of homogeneous and heterogeneous ensemble classifiers, Retrieved from Internet:<https://www.sciencedirect.com/science/article/pii/S0141933115001593>(Year: 2015).*

(Continued)

*Primary Examiner* — Miranda M Huang
*Assistant Examiner* — Bart I Rylander
(74) *Attorney, Agent, or Firm* — Georgiy L. Khayet

(57)                    ABSTRACT

Systems and methods for performing multiple locally stored artificial neural network (ANN) computations are provided. An example method comprises receiving, by one or more processing units, an ANN dataset associated with at least one ANN of a plurality of ANNs; storing, by processing units, the ANN dataset in a memory coupled to the processing units; associating, by the processing units, a base address with the at least one ANN, wherein the base address is to be used to locate the ANN dataset in the memory; keeping, by the processing units, the ANN dataset in the memory; receiving, by the processing units, an input dataset and the base address; determining, by the processing units and based on the base address, a location of the ANN dataset in the memory; and performing, by the processing units, ANN computation using the ANN dataset and input dataset.

20 Claims, 14 Drawing Sheets

(56) References Cited

OTHER PUBLICATIONS

Nabiyouni, M. et al, A Highly Parallel Multi-Class Pattern Classi-
fication on GPU, Retrieved from Internet:<https://ieeexplore.ieee.
org/abstract/document/6217416> (Year: 2012).*
Mand, N. et al, Artificial Neural Network Emulation on NOC based
Multi-Core FPGA Platform, Retrieved from Internet:<https://
ieeexplore.ieee.org/abstract/document/6403122> (Year: 2012).*
Ribeiro, M., et al, MLaaS: Machine Learning as a Service, Retrieved
from Internet:<https://ieeexplore.ieee.org/abstract/document/
7424435> (Year: 2015).*

* cited by examiner

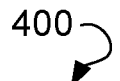
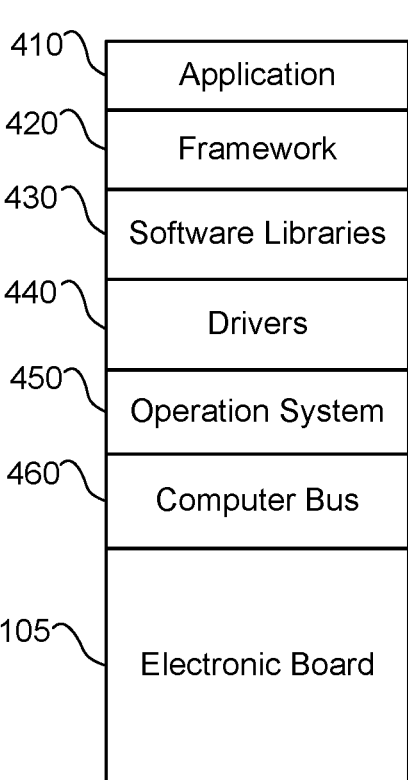
410 Application
420 Framework
430 Software Libraries
440 Drivers
450 Operation System
460 Computer Bus
105 Electronic Board
FIG. 4

1000

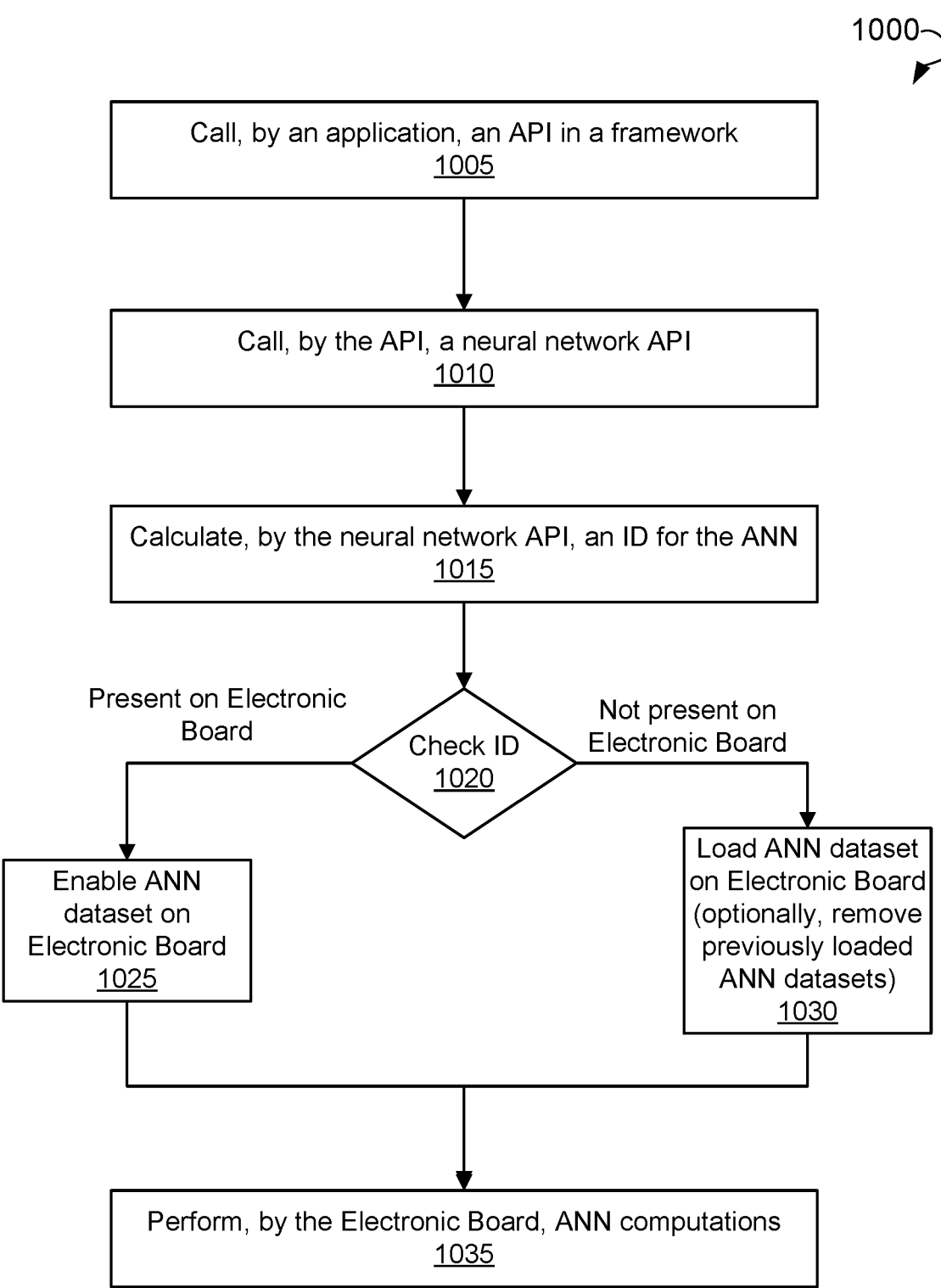

Call, by an application, an API in a framework
1005

Call, by the API, a neural network API
1010

Calculate, by the neural network API, an ID for the ANN
1015

Present on Electronic Board

Check ID
1020

Not present on Electronic Board

Enable ANN dataset on Electronic Board
1025

Load ANN dataset on Electronic Board (optionally, remove previously loaded ANN datasets)
1030

Perform, by the Electronic Board, ANN computations
1035

FIG. 10

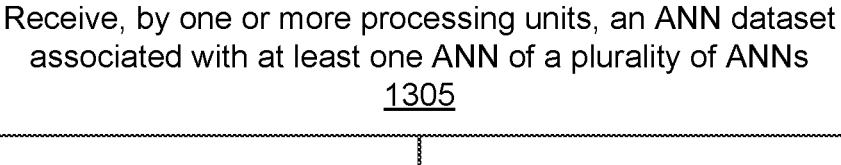

Receive, by one or more processing units, an ANN dataset associated with at least one ANN of a plurality of ANNs
1305

Determine, by the processing units, a base address for the ANN, wherein the base address is to be used to locate the ANN dataset in a memory coupled to the one or more processing units
1310

Store, by the processing units, the ANN dataset in the memory at the determined base address
1315

Keep, by the processing units, the ANN dataset in the memory until receiving an indication to remove the ANN dataset from the memory
1320

FIG. 13

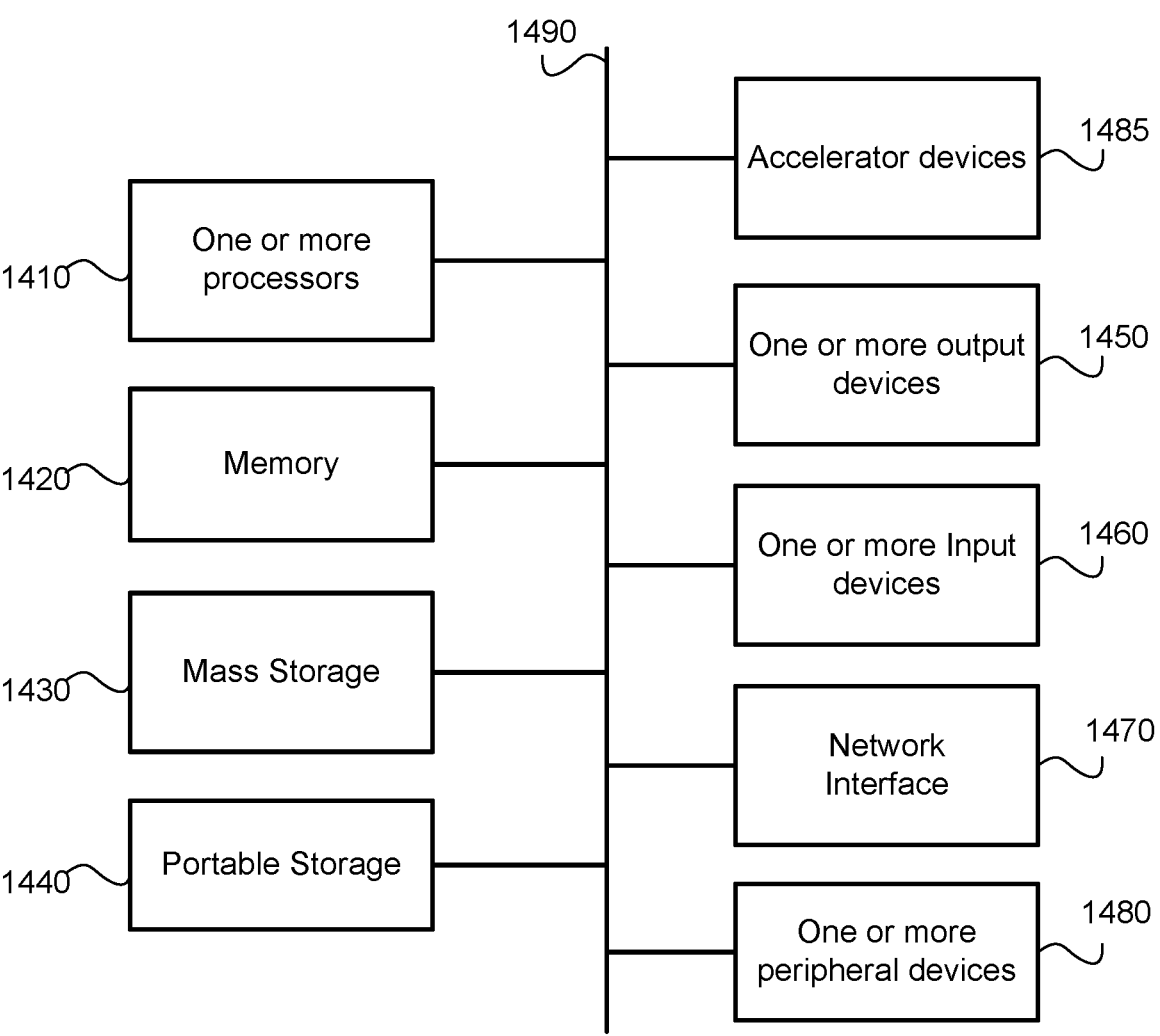
FIG. 14

MULTIPLE LOCALLY STORED ARTIFICIAL NEURAL NETWORK COMPUTATIONS

TECHNICAL FIELD

The present disclosure relates generally to data processing and, more particularly, to a system and method for performing multiple locally stored artificial neural network (ANN) computations.

BACKGROUND

Artificial Neural Networks (ANNs) are simplified and reduced models reproducing the behavior of human brain. The human brain contains 10-20 billion neurons connected through synapses. Electrical and chemical messages are passed from neurons to neurons based on input information and their resistance to passing information. In the ANNs, a neuron can be represented by a node performing a simple operation of addition coupled with a saturation function. A synapse can be represented by a connection between two nodes. Each of the connections can be associated with an operation of multiplication by a constant. The ANNs are particularly useful for solving problems that cannot be easily solved by classical computer programs.

While forms of the ANNs may vary, they all have the same basic elements similar to the human brain. A typical ANN can be organized into layers, and each of the layers may include many neurons sharing similar functionality. The inputs of a layer may come from a previous layer, multiple previous layers, any other layers, or even the layer itself. Major architectures of ANNs include Convolutional Neural Network (CNN), Recurrent Neural Network (RNN), and Long Term Short Memory (LTSM) network, but other architectures of ANN can be developed for specific applications. While some operations have a natural sequence, for example a layer depending on previous layers, most operations can be carried out in parallel within the same layer. The ANNs can then be computed in parallel on many different computing elements similar to neurons of the brain. A single ANN may have hundreds of layers. Each of the layers can involve millions of connections. Thus, a single ANN may potentially require billions of simple operations like multiplications and additions.

Because of the larger number of operations and their parallel nature, ANNs can result in a very heavy load for processing units (e.g., CPU), even ones running at high rates. Sometimes, to overcome limitations of CPUs, graphics processing units (GPUs) can be used to process large ANNs because GPUs have a much higher throughput capacity of operations in comparison to CPUs. Because this approach solves, at least partially, the throughput limitation problem, GPUs appear to be more efficient in the computations of ANNs than the CPUs. However, GPUs are not well suited to the computations of ANNs because the GPUs have been specifically designed to compute graphical images.

The GPUs may provide a certain level of parallelism in computations. However, the GPUs are constraining the computations in long pipes implying latency and lack of reactivity. To deliver the maximum throughput, very large GPUs can be used, which may involve excessive power consumption, which is a typical issue of GPUs. Since the GPUs may require more power consumption for the computations of ANNs, the deployment of GPUs can be difficult.

To summarize, CPUs provide a very generic engine that can execute very few sequences of instructions with a minimum effort in terms of programming, but lack the power of computing for ANN. The GPUs are slightly more parallel and require a larger effort of programming than CPUs, which can be hidden behind libraries with some performance costs but are not very suitable for ANNs.

Field Programmable Gate Arrays (FPGAs) are professional components that can be programmed at the hardware level after they are manufactured. The FPGAs can be configured to perform computations in parallel. Therefore, FPGAs can be well suited to compute ANNs. One of the challenges of FPGAs is the programming, which requires a much larger effort than programming CPUs and GPUs. Adaption of FPGAs to perform ANN computations can be more challenging than for CPUs and GPUs.

Most attempts in programming FPGAs to compute ANNs have been focusing on a specific ANN or a subset of ANNs requiring modification of the ANN structure to fit into a specific limited accelerator or providing a basic functionality without solving the problem of computing ANN on FPGAs globally. The computation scale is typically not considered for existing FPGA solutions, with much of the research being limited to a single or few computation engines, which could be replicated. The existing FPGA solutions do not solve the problem of massive data movement required at large scale for the actual ANN involved in real industrial applications. The inputs to be computed with an ANN are typically provided by an artificial intelligence (AI) framework. Those programs are used by the AI community to develop new ANN or global solutions based on ANN. Furthermore, the FPGAs lack integration in those software environments.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

According to an example embodiment, a system for performing multiple locally stored ANN computations is provided. The system may include one or more processing units and a memory coupled to the one or more processing units. The processing units can be configured to receive an ANN dataset associated with an ANN of a plurality of ANNs. The processing units may store the ANN dataset at a base address in the memory. The processing units can receive at least one further ANN dataset associated with at least one further ANN of the plurality of ANNs. The further ANN dataset may differ from the ANN dataset. The processing units may store the further ANN dataset in the memory at a further base address. The processing units may receive an input dataset associated with an address. The processing units may read, based on the received address, the memory to perform an ANN computation.

Storing the ANN dataset in the memory can be controlled by a first process and the ANN computation can be controlled by a second process. The first process can be different from the second process. Ending the first process does not cause freeing part of the memory in which the ANN dataset is stored.

The processing units may receive a further address corresponding to the further base address. The further base address is different from the base address. The processing units may perform a further ANN computation based on the received further address.

The processing units may keep the ANN dataset in the memory until receiving an indication to remove the ANN dataset from the memory or until the processing unit determines that the ANN dataset is no longer required.

The processing units are configured to perform an ANN computation using the ANN dataset and a further ANN computation using the at least one further ANN dataset in a sequence based on an order. The order is determined by an order of receiving a first input dataset for the ANN dataset and a second input dataset for the further ANN dataset and while both the ANN dataset and the further ANN dataset are stored in memory.

The processing units can be configured to receive priorities associated with the ANN dataset and the at least one further dataset ANN. The processing units can perform an ANN computation using the ANN dataset and a further ANN computation using the further ANN dataset in a sequence based on the priorities.

The ANN dataset may include a first layer data associated with a first layer of the ANN and a second layer data associated with a second layer of the ANN. The processing units can be configured to keep the first layer data in the memory until receiving a first indication to remove the first layer data from the memory. The processing units can be configured to keep the second layer data in the memory until receiving a second indication to remove the second layer data from the memory. The first indication can differ from the second indication.

The processing units may store a result of the ANN computation in the memory. The processing units may receive the further base address of the further ANN dataset and an instruction to perform a further ANN computation using the result of the ANN computation for the input dataset.

The processing units can be configured to receive an input dataset and a base address instead of the base address. The unique identifier can be determined based on the ANN dataset. The ANN dataset may include a description of operations included in the ANN and parameters associated with connections of the ANN.

The processing units can be configured to receive an input dataset and a base address. The processing units may determine, based on the base address, a location of the ANN dataset in the memory. The processing units may perform an ANN computation using the ANN dataset and the input dataset. The processing unit may store the result of the ANN computation in the memory. The processing unit may receive an instruction to perform further ANN computation using the further ANN dataset based on the further base address and the result of the ANN computation.

The processing units can be configured to receive a unique identifier of the ANN dataset. The processing units may associate the unique identifier with a base address. The processing units may keep the unique identifier in the memory while the ANN dataset is not removed from the memory. The unique identifier can be determined based on the ANN dataset. The ANN dataset may include a description of neurons of the ANN and weights associated with the neurons of the ANN.

The processing units can be configured to receive an input dataset and a unique identifier. The processing may determine, based on the unique identifier, the base address of the ANN dataset in the memory, wherein the ANN dataset is associated with the unique identifier. The processing units may perform an ANN computation using the ANN dataset and the input dataset.

The processing units can be configured to receive a unique identifier and an instruction to remove the ANN dataset. The processing units can remove, from the memory, the information concerning an association between the unique identifier and the base address and, thereby, remove the ANN dataset from the memory.

The processing units can be configured to receive an input dataset for one or more ANNs of the plurality of ANNs. The processing units may store the input dataset in the memory. The processing units may associate an input base address with the input dataset. The input base address can be used to locate the input dataset in the memory. The processing units can keep the input dataset in the memory until receiving an indication to remove the input dataset. The input dataset can be used for an ANN computation of one or more ANNs of the plurality of ANNs.

The processing units can receive a base address and the input base address. The processing units may determine, based on the base address, a location of the ANN dataset in the memory. The processing units can determine, based on the input base address, a location of the input dataset in the memory. The processing units may perform an ANN computation using the ANN dataset and the input dataset.

The processing units can be configured to store a result of the ANN computation as a further input dataset in the memory. The processing units may assign a further input base address to the further input dataset. The further input base address can be used to locate the further input dataset in the memory.

The processing units can be configured to divide an address space of the memory between ANNs of the plurality of ANNs.

The processing units and the memory can be integrated into an electronic circuit configured to perform computations of two and more ANNs of the plurality of ANNs. The electronic circuit includes at least one field programmable gate array.

According to one example embodiment, a method for performing multiple locally stored ANN computations is provided. The method may include receiving, by one or more processing units, an ANN dataset associated with at least one ANN of a plurality of ANNs. The method may include determining, by the processing units, a base address for the ANN, wherein the base address is to be used to locate the ANN dataset in a memory coupled to the one or more processing units. The method may include storing, by processing units, the ANN dataset in the memory at the determined base address. The method may include keeping, by the processing units, the ANN dataset in the memory until receiving an indication to remove the ANN dataset from the memory.

The method may further include receiving, by the processing units, an input dataset and the base address. The method may include determining, by the processing units and based on the base address, a location of the ANN dataset in the memory. The method may include performing, by the processing units, ANN computations using the ANN dataset and input dataset.

According, to another example embodiment, a system for performing multiple locally stored ANN computations is provided. The system may include one or more processing units and a memory coupled to the one or more processing unit. The processing units may receive one or more ANN datasets and one or more input datasets associated with one or more ANNs of a plurality of ANNs. Each of the ANN datasets may include a description of structure of parameters of at least one ANN of the plurality of ANNs. The processing units may store the ANN datasets and the input datasets in the memory. The processing units may associate one or more base addresses with the ANN datasets, wherein the base addresses are to be used to locate the ANN datasets in the memory. The processing units may associate one or more input base addresses with the input datasets, wherein the input base addresses are to be used to locate the input datasets in the memory. The processing units may receive a computational model. The computational model may include relations between the base addresses and the input base addresses. The processing units may perform, based on the computational model, one or more ANN computations.

Additional objects, advantages, and novel features will be set forth in part in the detailed description section of this disclosure, which follows, and in part will become apparent to those skilled in the art upon examination of this specification and the accompanying drawings or may be learned by production or operation of the example embodiments. The objects and advantages of the concepts may be realized and attained by means of the methodologies, instrumentalities, and combinations particularly pointed out in the appended claims.

BRIEF DESCRIPTION OF THE DRAWINGS

Embodiments are illustrated by way of example and not limitation in the figures of the accompanying drawings, in which like references indicate similar elements and, in which:

FIG. 4 is a block diagram showing an example stack for performing ANN commutations, according to an example embodiment.

FIG. 10 is a flow chart of an example method for performing multiple locally stored ANN computations, according to some example embodiments.

FIG. 13 is a block diagram showing a method for performing multiple locally stored ANN computations, according to some example embodiments.

FIG. 14 shows a computing system that can be used to implement embodiments of the disclosed technology.

DETAILED DESCRIPTION

Figure 1:
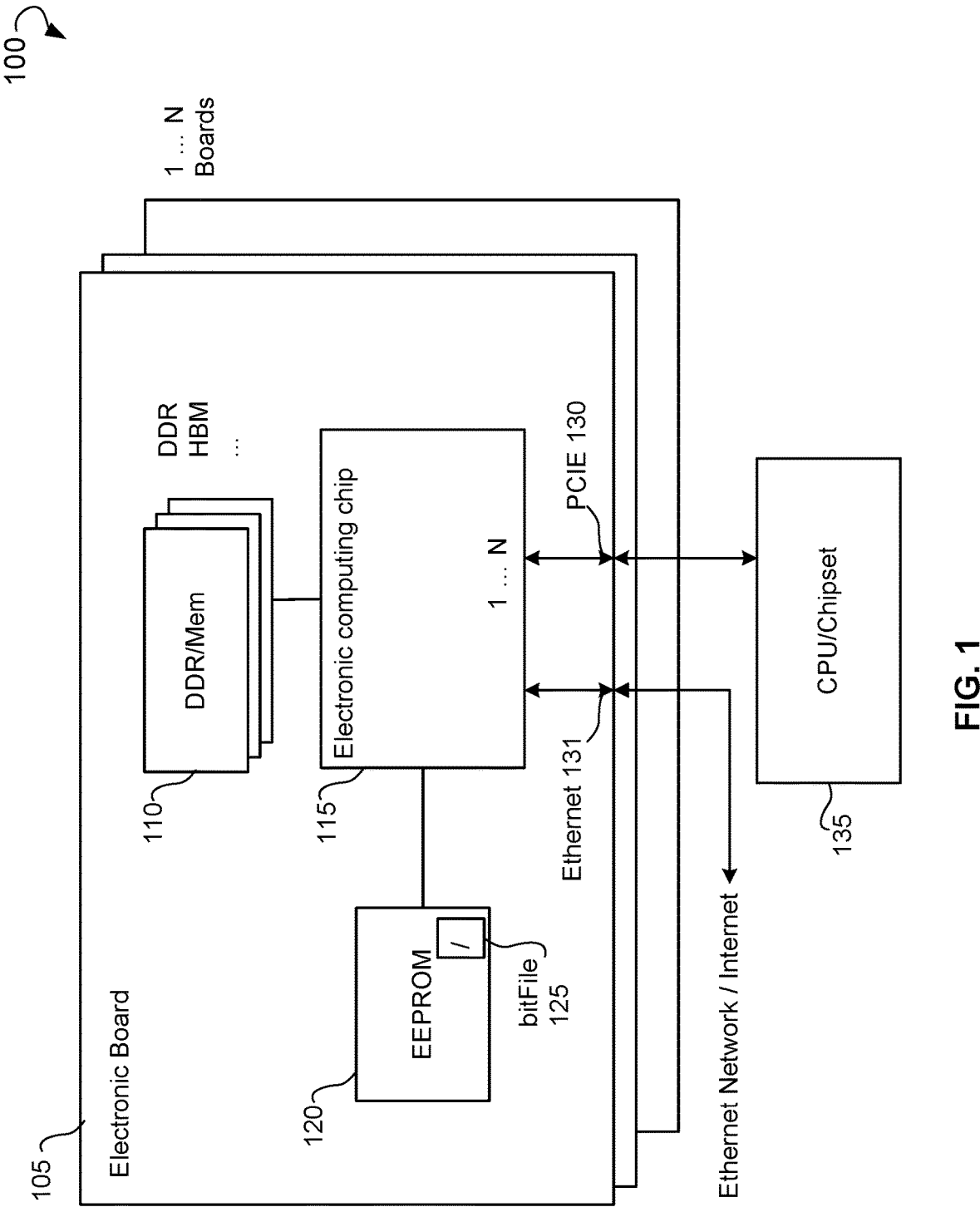
FIG. 1 is a block diagram showing an example system wherein a method for multiple locally stored ANN computations can be implemented, according to some example embodiments.

The following detailed description includes references to the accompanying drawings, which form a part of the detailed description. The drawings show illustrations in accordance with exemplary embodiments. These exemplary embodiments, which are also referred to herein as "examples," are described in enough detail to enable those skilled in the art to practice the present subject matter. The embodiments can be combined, other embodiments can be utilized, or structural, logical, and electrical changes can be made without departing from the scope of what is claimed. The following detailed description is, therefore, not to be taken in a limiting sense, and the scope is defined by the appended claims and their equivalents.

For purposes of this document, the terms "or" and "and" shall mean "and/or" unless stated otherwise or clearly intended otherwise by the context of their use. The term "a" shall mean "one or more" unless stated otherwise or where the use of "one or more" is clearly inappropriate. The terms "comprise," "comprising," "include," and "including" are interchangeable and not intended to be limiting. For example, the term "including" shall be interpreted to mean "including, but not limited to."

Embodiments of the present disclosure can be implemented using integrated circuits, for example, CPU, GPU, application-specific integrated circuits (ASICs) or FPGAs. The present technology may be also practiced with programmable logic devices, transistor-based circuits, or various combinations thereof. The methods described herein can be also implemented by hardware modules, software modules, or combinations of both. The methods can also be embodied in computer-readable instructions stored on computer-readable media.

The term "module" shall be construed to mean a hardware device, software, or a combination of both. For example, a hardware-based module can use one or more microprocessors, FPGAs, ASICs, programmable logic devices, transistor-based circuits, or various combinations thereof. Software-based modules can constitute computer programs, computer program procedures, computer program functions, and the like. In addition, a module of a system can be implemented by a computer or server, or by multiple computers or servers interconnected into a network. Alternatively, module may also refer to a subpart of a computer system, a hardware device, an integrated circuit, or a computer program.

Embodiments of this disclosure are concerned with methods and systems for multiple locally stored ANN computations. According to some example embodiments, a system for performing multiple ANN computations may include one or more processing units and a memory coupled with the processing units. The system may be configured to receive, from one or more external applications, one or more ANN datasets and one or more input datasets. An ANN dataset may include a description of a structure of neurons of an ANN, weights of connections between neurons, and other parameters of the ANN. The input dataset may include input data for neurons of the ANN. The system may perform ANN computation only for one of the ANN datasets and one of the input datasets at the same time.

Upon receiving an ANN dataset from the external applications, the processing units may store the ANN dataset in a memory. The processing units may provide to the external applications an address of the ANN dataset in the memory. The external applications may further send an input dataset and the address to system. The processing units may retrieve, based on the address, the ANN dataset from the memory and perform ANN computation based on the ANN dataset and the input dataset. The processing units may store multiple ANN datasets for multiple ANNs in one or more memories. The external applications may request computation of a specific ANN by specifying a specific address. Similarly, the processing units may store in the one or more memories multiple input datasets to be used in computations for different ANNs. The ANN datasets and the input datasets can be kept in memory to avoid unnecessary reloading, by the external application, of either the ANN datasets or the input datasets to the memory.

At a given moment, the memory may store multiple layer datasets associated with multiple ANNs of a plurality of ANN. The processing units may write, to the memory, a set of layer datasets associated with at least one ANN of the plurality of ANN based on received one or more indications to memorize one or more layer datasets of a set of layers of the ANN.

Technical effects of certain embodiments of the present disclosure can include configuring integrated circuits, ASICs, FPGAs, or computer systems to perform computation of multiple ANNs. Further technical effects of some embodiments of the present disclosure can facilitate to effective use of memory of integrated circuits, ASICs, FPGAs, or computer systems during computations of multiple ANNs and so reduce the number of integrated circuits, ASICs, FPGAs, or computer systems required to implement computation of multiple ANNs.

Referring now to the drawings, exemplary embodiments are described. The drawings are schematic illustrations of idealized example embodiments. Thus, the example embodiments discussed herein should not be construed as limited to the particular illustrations presented herein, rather these example embodiments can include deviations and differ from the illustrations presented herein.

FIG. 1 is a block diagram showing an example system 100, wherein a method for performing multiple locally stored ANN computations can be implemented, according to some example embodiments. The system 100 can be part of a computing system, such as a personal computer, a server, a cloud-based computing recourse, and the like. The system 100 may include one or more electronic boards 105 and a chipset 135 including at least one CPU. The chipset 135 can be communicatively connected to the electronic boards 105 via a communication interface. The communication interface may include a Peripheral Component Interconnect Express (PCIE) standard 130. The communication interface may also include an Ethernet connection 131.

The electronic board 105 may include an electronic computing chip 115 like an FPGA, an ASIC, a GPU, a system on a chip (SOC) or any electronic component that allows performing mathematical operations related to a neural network, a volatile memory 110, and a non-volatile memory 120. The volatile memory 110 may include a double data rate synchronous dynamic random-access memory (DDR SDRAM), High Bandwidth Memory (HBM), or any other type of memory. The volatile memory 110 may include the host memory. The non-volatile memory 120 may include Electrically Erasable Programmable Read-Only Memory (EEPROM), a solid-state drive (SSD), a flash memory, and so forth.

The electronic computing chip 115 can include blocks. The blocks may include a set of elementary nodes (also referred to as gates) performing basic hardware operations, such as Boolean operations. The blocks may further include registers retaining bit information, one or more memory storage of different sizes, and one or more digital signal processors (DSPs) to perform arithmetic computations (for example, additions and multiplications). Programming of electronic computing chip 115 may include configuring each of the blocks to have an expected behavior and connecting the blocks by routing information between the blocks or loading a computing program. Programming of electronic computing chip 115 can be carried out using a result from a compiler taking as input high-level language, assembly instructions, scripts, schematic description, gate-level description, hardware languages like Verilog, System Verilog, or Very High Speed Integrated Circuit Hardware Description Language (VHDL), or any combination of thereof.

The non-volatile memory 120 may be configured to store instructions in a form of bit file 125 to be executed by the electronic computing chip 115. The electronic computing chip 115 can be configured by the instructions to perform one or more floating point operations or bitwise operations including multiplication and addition to calculate a sum of products that can be used in neural network computations.

The volatile memory 110 may be configured to store weights W[i] for neurons of one or more ANNs, input values V[i] to be processed for the ANNs, and results of ANNs computation including any intermediate results of computations of layers of the ANNs.

Figure 2:
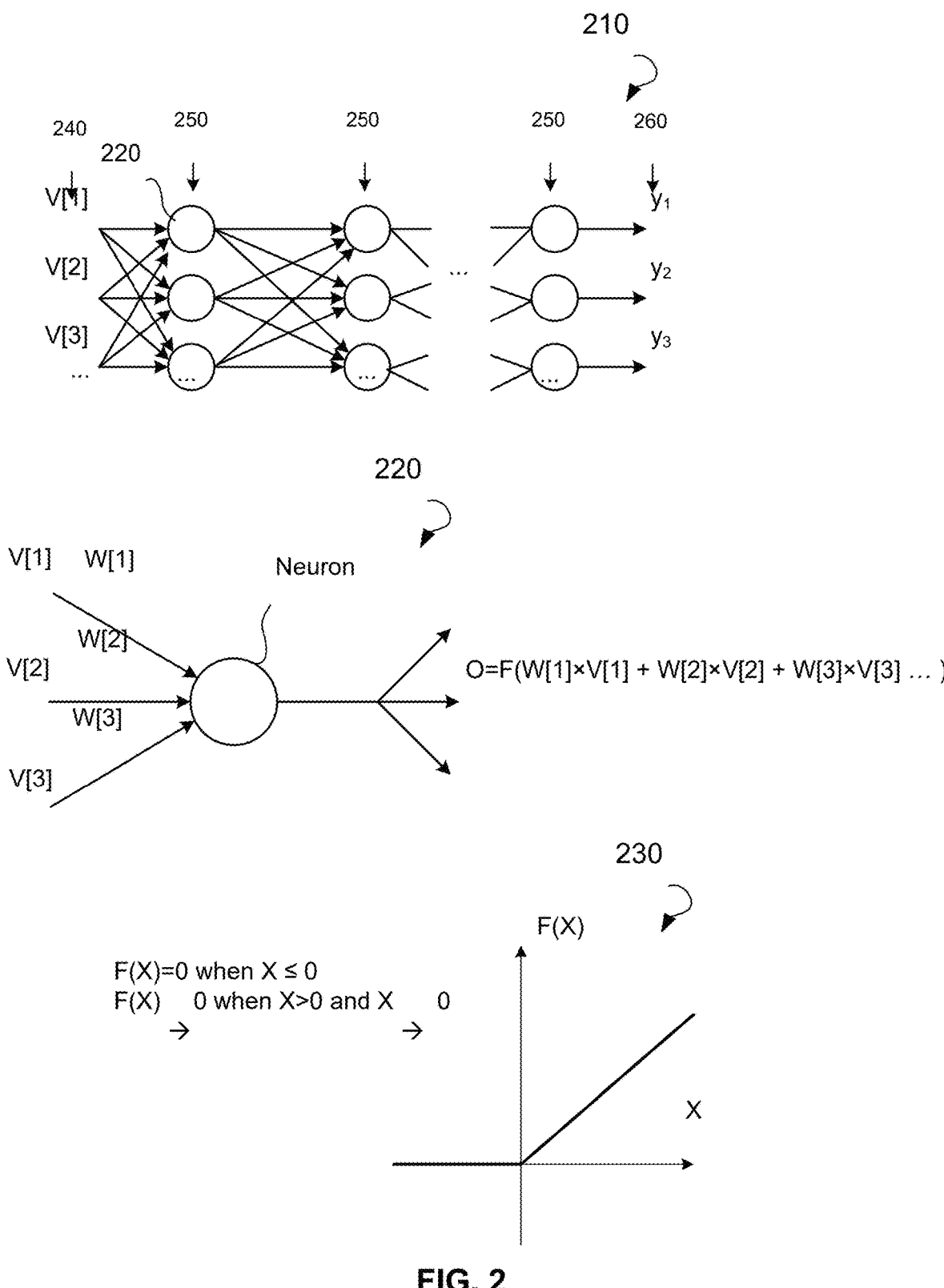
FIG. 2 shows an ANN, neuron, and transfer function, according to an example embodiment.

FIG. 2 shows ANN 210, neuron 220, and transfer function 230, according to some example embodiments. The ANN 210 may include one or more input layers 240, one or more hidden layers 250, and one or more output layers 260. Each of the input layers 240, hidden layers 250, and output layers 260 may include one or more (artificial) neurons 220. The number of neurons can be different for different layers.

Each of neurons 220 may represent a calculation of a mathematical function $$O = F\left(\sum_{i=1}^{n} V[i] \times W[i]\right) \qquad (1)$$

wherein V[i] are neuron input values, W[i] are weights assigned to input values at neuron, and F(X) is a transfer function. Typically, the transfer function 230 F(X) is selected to be zero for X<0 and have a limit of zero as X approaches zero. For example, the transfer function F(X) can be in the form of a sigmoid. The result of a calculation of a neuron propagates as an input value of further neurons in the ANN. The further neurons can belong to either the next layer, previous layer, or the same layer.

It should be noted that while the ANN 210 illustrated in FIG. 2 can be referred to as a feedforward neural network, embodiments of the present disclosure can be also used in computations of CNNs, recurrent neural networks, long short-term memory networks, and other types of ANNs.

Figure 3:
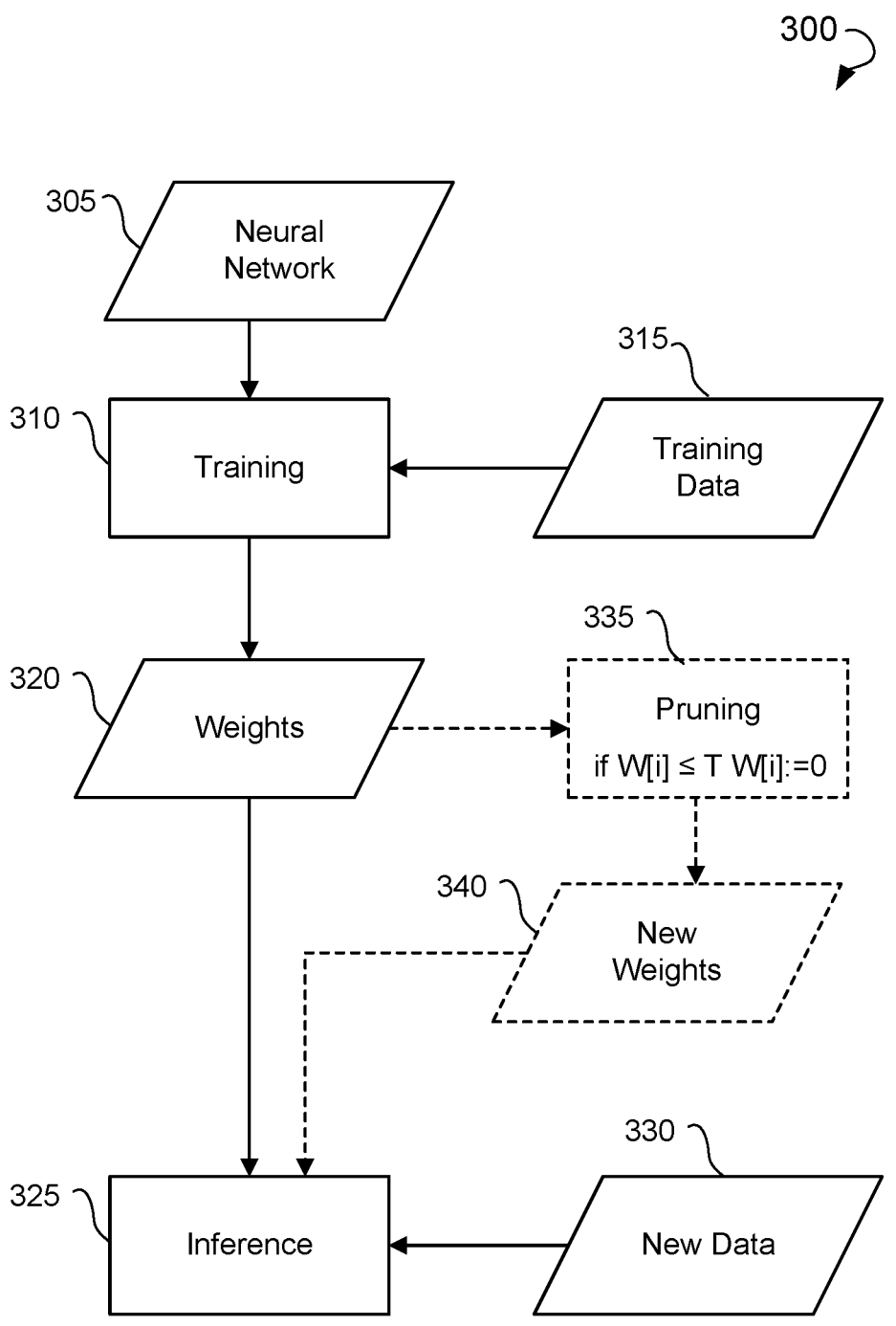
FIG. 3 is a flow chart showing training and inference of an ANN, according to some example embodiments.

FIG. 3 is a flow chart 300 showing training 310 and inference 325 of an ANN, according to some example embodiments. The training 310 (also known as learning) is a process of teaching ANN 305 to output a proper result based on a given set of training data 315. The process of training may include determining weights 320 of neurons of the ANN 305 based on training data 315. The training data 315 may include samples. Each of the samples may be represented as a pair of input values and an expected output. The training data 315 may include hundreds to millions of samples. While the training 310 is required to be performed only once, it may require a significant amount of computations and take a considerable time. The ANNs can be configured to solve different tasks including, for example, image recognition, speech recognition, handwriting recognition, machine translation, social network filtering, video games, medical diagnosis, and so forth.

The inference 325 is a process of computation of an ANN. The inference 325 uses the trained ANN weights 320 and new data 330 including new sets of input values. For each new set of input values, the computation of the ANN provides a new output which answers the problem that the ANN is supposed to solve. For example, an ANN can be trained to recognize various animals in images. Correspondingly, the ANN can be trained on millions of images of animals. Submitting a new image to the ANN would provide the information for animals in the new image (this process being known as image tagging). While the inference for each image takes less computations than training, a number of inferences can be large because new images can be received from billions of sources.

The inference 325 includes multiple computations of sum of products:

$$\sum_{i=1}^{n} V[i] \times W[i] \quad (2)$$

wherein the V[i] are new input values and W[i] are weights associated with neurons of ANN. Some previous approaches for performing inference include inspection of the weights W[i] and replacing some of the weights W[i] with zero values if a value of the weight is relatively small when compared to other weights of the ANN. In FIG. 3, this process is shown as pruning 335. The pruning 335 generates new weights 340 that then can be used in inference 325 instead of the weights 320. Replacing the weights with zero values may allow decreasing the number of computations of the ANN, since multiplications by zero can be avoided in computations.

FIG. 4 is a block diagram showing an example stack 400 for performing ANN computations, according to an example embodiment. The stack 400 may include an application 410, a framework 420, software libraries 430, drivers 440, operating system 450, computer bus 460, and an electronic board 105. The application 410 may request computation of an ANN for an input dataset. Framework 420 may include an application programming interface (API) to organize the ANN computations and generate an ANN dataset in a pre-determined format. The ANN dataset may include description of the structure of neurons of the ANN, weights of the neurons of the ANN, and other parameters of the ANN.

Modules of the software libraries 430 can be called from the framework 420. The framework 420 may provide the ANN dataset and the input dataset to the modules of the software libraries 430. The ANN dataset and the input dataset can be further provided, via the drivers 440, the operating system 450, and the computer bus 460, to the electronic board 105. The electronic board 105 can be configured to perform ANN computations based on the ANN dataset and the input dataset. The ANN dataset and the input dataset can be stored in a memory of the electronic board 105 prior to the ANN computations. Typically, after the ANN computations are completed for a specific ANN dataset, the ANN dataset and the input dataset are removed from the memory of the electronic board 105.

When the application 410 requests a further ANN computation for the same ANN after one or more other ANN has been computed, the ANN dataset needs to be loaded again in the memory of the electronic board 105. It takes time to generate the ANN dataset in a pre-determined format; provide the ANN dataset, via the software libraries 430, the drivers 440, the operating system 450, and the computer bus 460, to the electronic board 105; and write the ANN dataset to the memory of the electronic board 105. Therefore, according to some embodiments of the present disclosure, the ANN dataset can be kept in the memory electronic board after finishing the ANN computations. The ANN dataset can be further used in further ANN computation of the ANN with further input datasets. Additionally, it would be more efficient to use the memory of the electronic board 105 to store ANN datasets corresponding to two or more different ANNs.

In some embodiments, where the system 100 consists of only the electronic board 105, one or more ANN datasets can be provided to the electronic board 105 from an external memory or from a further computing system via an electronic bus. The ANN datasets can be written to the memory of the electronic board 105. The ANN datasets can be kept in the memory after finishing the ANN computation.

Figure 5A:
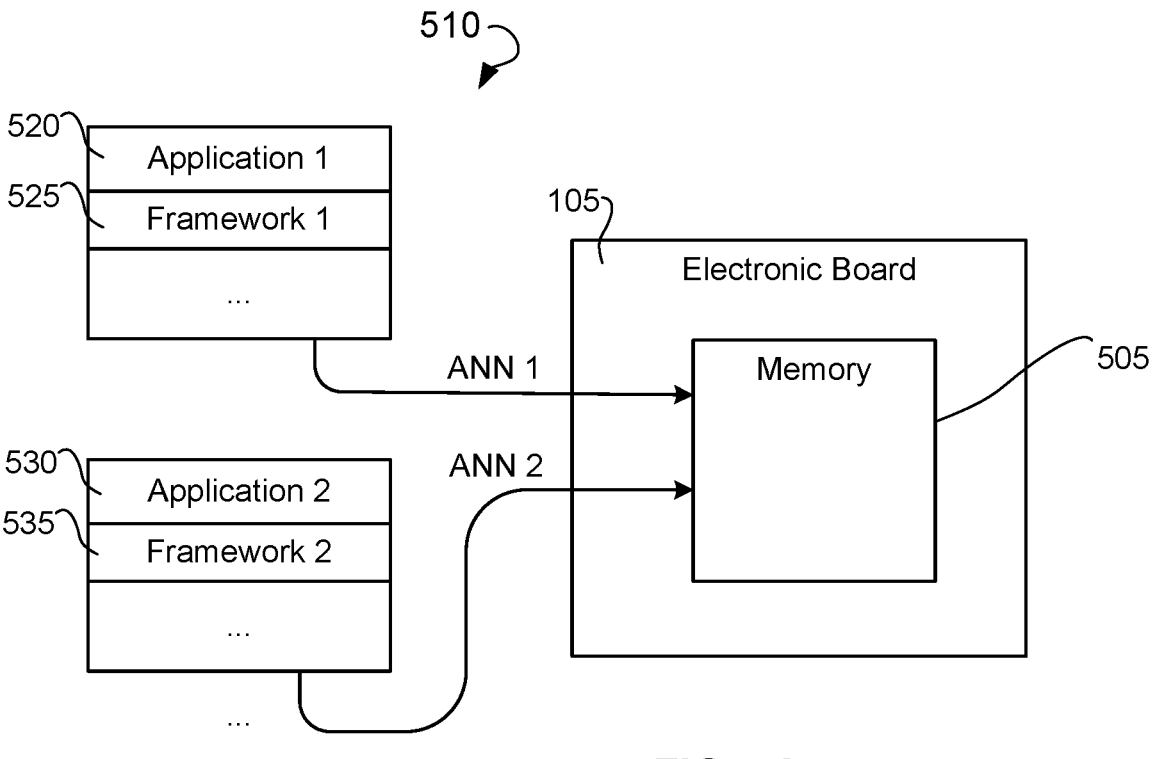
FIG. 5A is a block diagram showing an example system, wherein a method for performing multiple locally stored ANN computations can be implemented.

FIG. 5A is a block diagram showing example system 510, wherein a method for performing multiple locally stored ANN computations can be implemented. The system 510 may include application 520, application 530, and an electronic board 105. The application 520 may request, via a framework 525, computation of a first ANN on the electronic board 105. The application 530 may request, via a framework 535, computation of a second ANN on the same electronic board 105. A dataset of the first ANN and a dataset of the second ANN can be preloaded in the memory 505 of the electronic board 105. The dataset of the first ANN may include a description of the structure of neurons of the first ANN, weights for connections between neurons of the first ANN, and other parameters of the first ANN. Similarly, the dataset of the second ANN may include a description of the structure of neurons of the second ANN, weights for connections between neurons of the second ANN, and other parameters of the second ANN. The dataset of the first ANN and the dataset of the second ANN can be stored in the memory 505 of the electronic board 105 when the application 520 and application 530 request the ANN computations for the first time.

The electronic board 105 can be configured to receive, from the application 520, an input data for the first ANN, determine location of the datasets of the first ANN in the memory 505, and perform computations based on the input dataset and the dataset of the first ANN. Similarly, the electronic board 105 can be configured to receive, from the application 530, an input dataset for the second ANN, determine location of the datasets of the second ANN in the memory 505, and perform computations based on the input dataset and the dataset of the second ANN.

Typically, the electronic board 105 can perform computations for only one of the first ANN or the second ANN at the same time. The dataset of the first network and the dataset of the second network can be stored in memory 505 until the electronic board 105 receives a request to remove the dataset of the first network and the dataset of the second network from the memory. It should be noted that memory 505 may refer to all memory devices located at the electronic board 105.

In some other embodiments, the electronic board 105 may not receive instructions for removal of ANN datasets stored in the memory 505. In these embodiments, the computing chip 115 may be programmed to manage the set of ANNs stored in the memory 505. The removal of an ANN from the memory can be performed automatically when no more space is available in the memory to store a new ANN dataset. The removal can be based on a priority assigned to each ANN, the least prioritized ANN being removed first. The removal can be based on the age of an ANN stored in the memory, the oldest being removed first. The removal can be based on the number of uses of an ANN, the least used one recently being removed first. Moreover, removal can be based on a combination of these conditions.

Figure 5B:
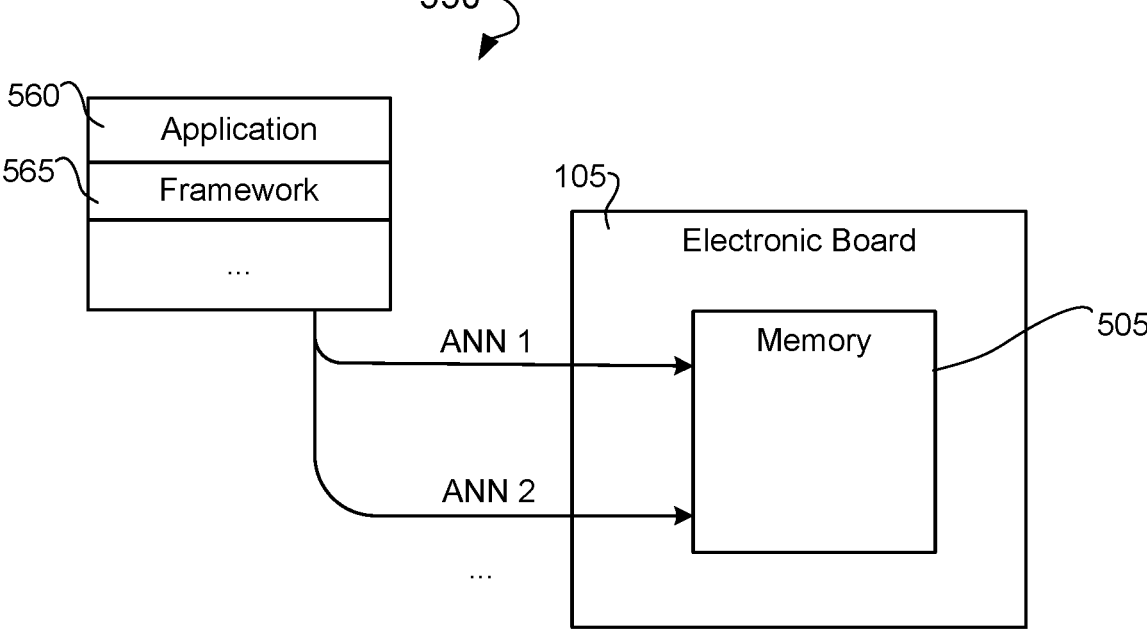
FIG. 5B is a block diagram showing an example system, wherein a method for performing multiple locally stored ANN computations can be implemented.

FIG. 5B is a block diagram showing example system 550, wherein a method for performing multiple locally stored ANNs computations can be implemented. The system 550 may include an application 560 and an electronic board 105. The application 560 may request, via a framework 565, computation of a first ANN and computation of a second ANN on the same electronic board 105. As described in FIG. 5A, a dataset of the first ANN and a dataset of the second ANN can be kept in memory 505 of the electronic board 105 while the application 560 may request computation of the either the first ANN or the second ANN for multiple input datasets. In other embodiments, a system for performing multiple locally stored ANN computations can include any combinations of the system 510 and the system 550.

Figure 6B:
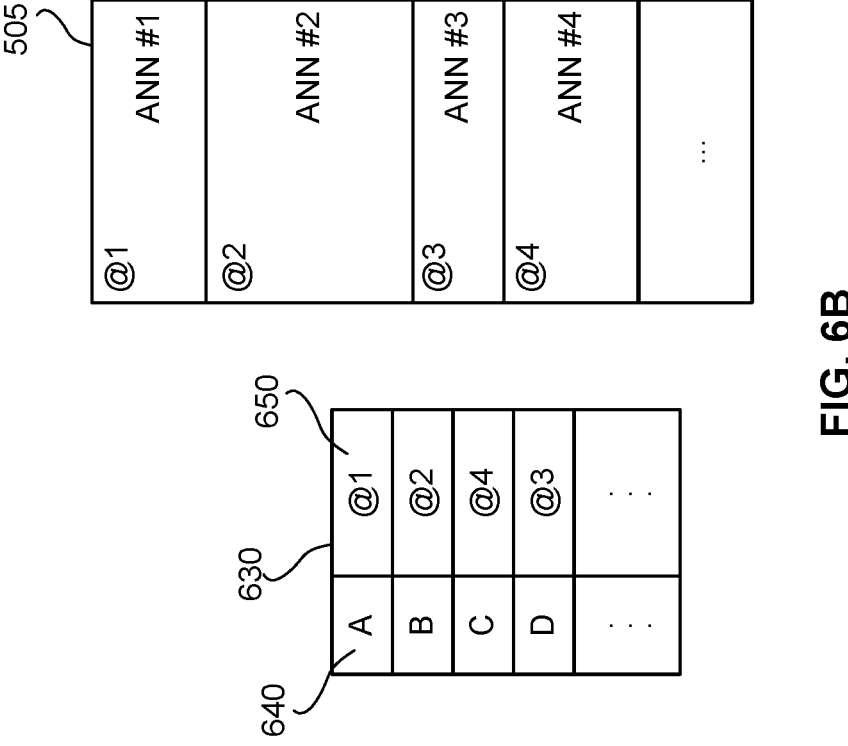
FIG. 6B is a block diagram showing a memory being used for multiple ANN computations, according to another example embodiment.
Figure 6A:
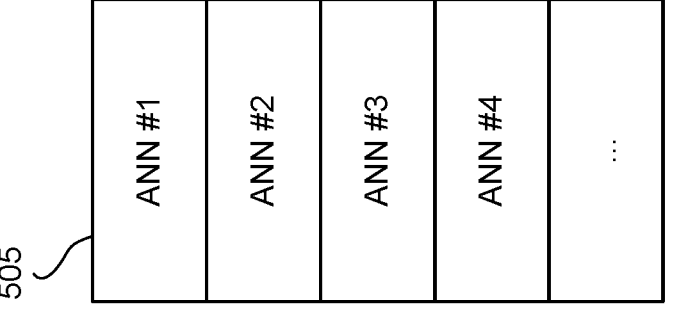
FIG. 6A is a block diagram showing a memory being used for multiple ANN computations, according to an example embodiment.

FIG. 6A is a block diagram showing a memory 505 being used for multiple ANN computations, according to an example embodiment. In the example of FIG. 6A, the memory 505 is divided in N equal address spaces. Size of each of the address spaces can be 1/N of the size of memory 505 and can be designated to store a dataset of one of ANNs of a plurality of ANNs. However, dividing the memory into equal spaces may not be efficient because datasets of some ANNs of the plurality of ANNs can be less than 1/N of the memory. Therefore, some portions of the equal spaces may be unused during multiple ANN computations.

FIG. 6B is a block diagram showing a memory 505 being used for multiple ANN computations, according to another example embodiment. In the example of FIG. 6B, the memory 505 can be divided in address spaces of different sizes. The sizes of the address spaces can be substantially equal to the sizes required to store the datasets of ANNs of the plurality of ANNs. ANNs can be associated with base addresses @1, @2, @3, and so forth. Each of the base addresses may indicate an address at which a dataset of one of ANNs starts in the memory 505.

In some embodiments, each of the ANNs stored in the memory 505 can be assigned a unique identifier. The system 100 may include a table 630 of unique identifiers of ANNs 640 stored in the memory and base addresses 650 corresponding to the ANNs.

Figure 7:
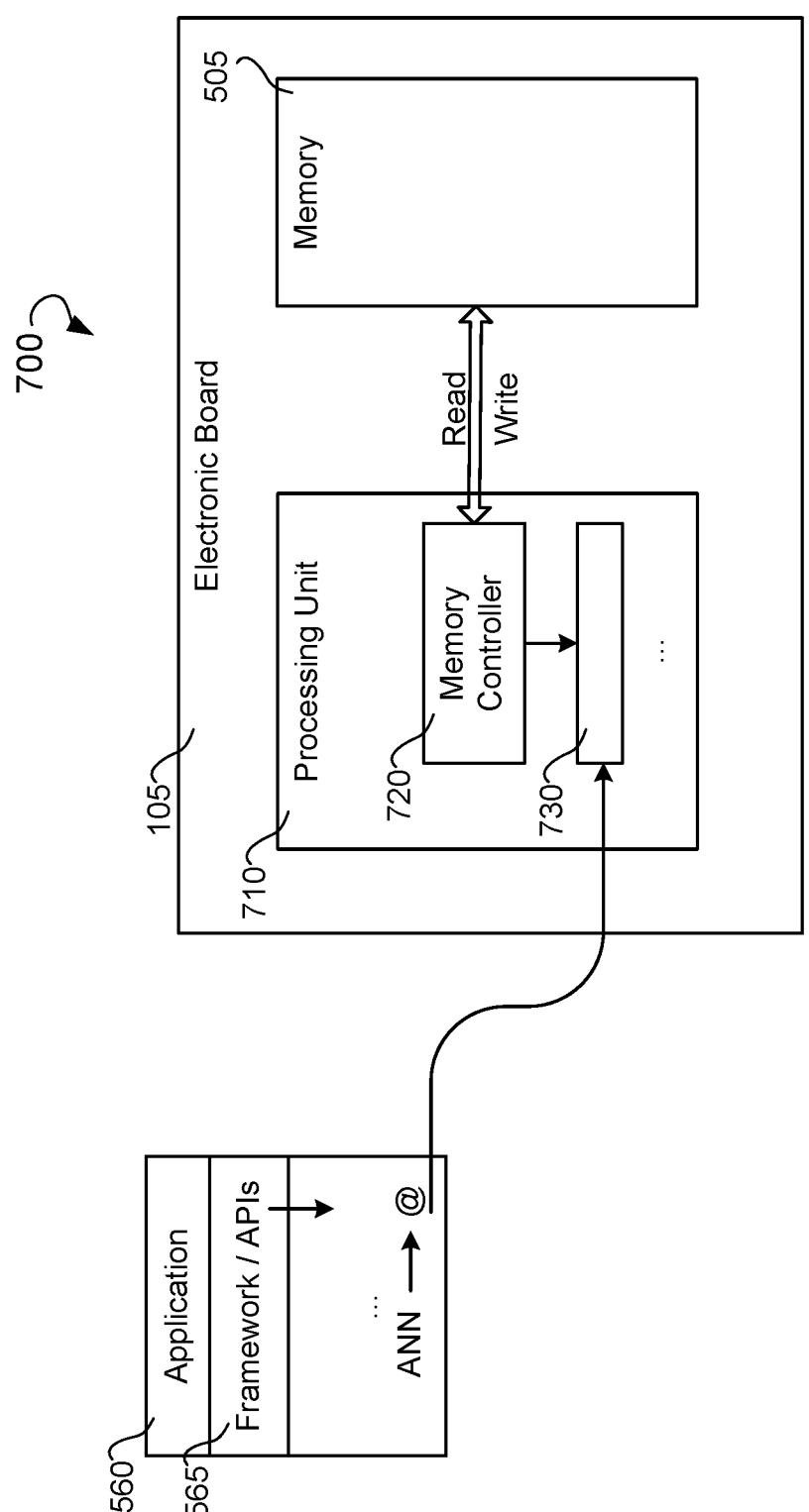
FIG. 7 is a block diagram showing an example system suitable for performing multiple locally stored ANN computations, according to some embodiments.

FIG. 7 is a block diagram showing an example system 700 suitable for performing multiple locally stored ANN computations, according to some embodiments. The system 700 may include an application 560, a framework 565, and an electronic board 105. The electronic board 105 may include a memory 505 and a processing unit 710. The framework 565 may include software libraries implementing one or more APIs. The processing unit 710 may include a memory controller 720 and one or more configuration register(s) 730.

Figure 8:
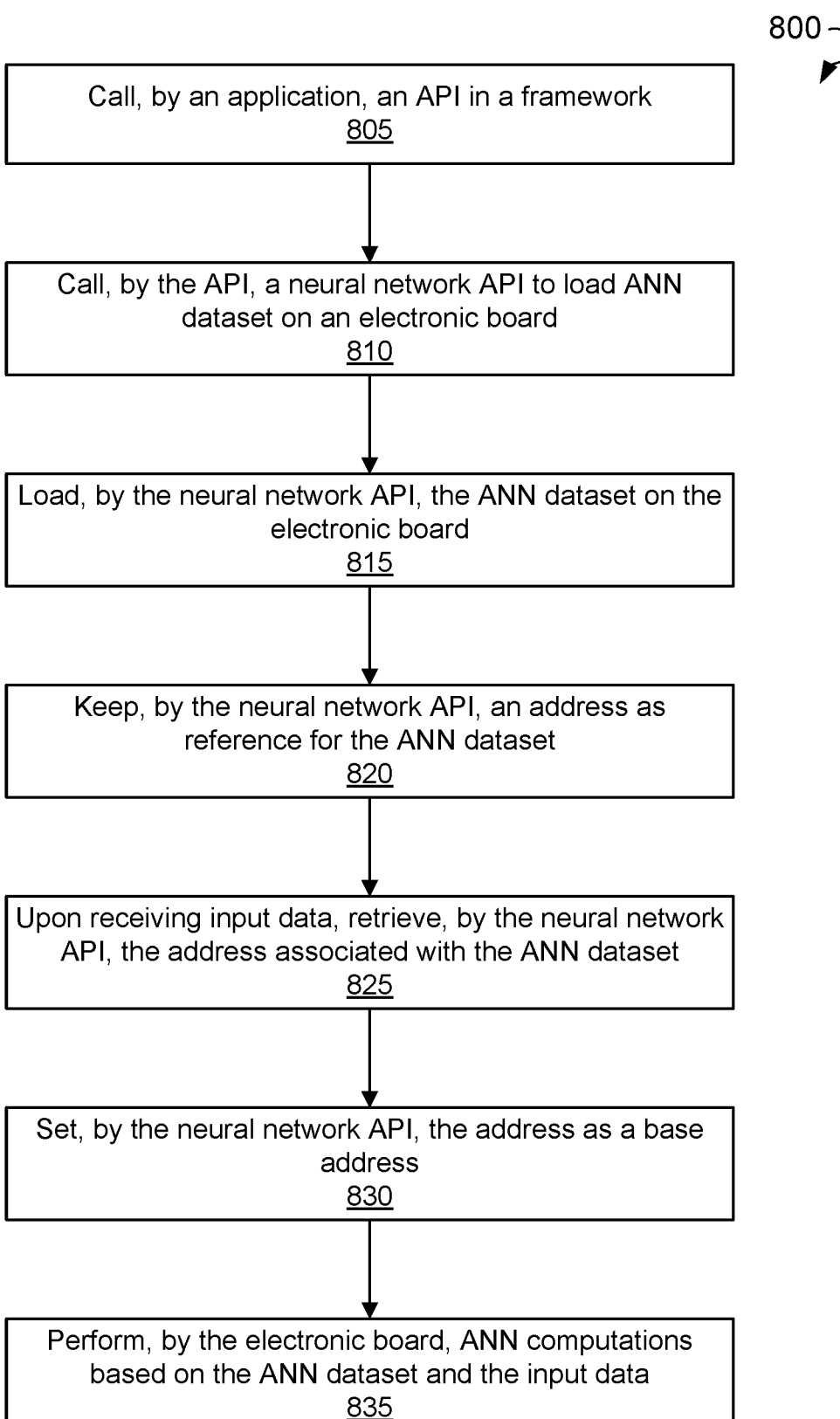
FIG. 8 is flow diagram showing an example method for performing multiple locally stored ANN computations, according to an example embodiment.

FIG. 8 is flow diagram showing example method 800 for performing multiple locally stored ANN computations, according to an example embodiment. The method 800 may be implemented by system 700.

The method 800, may commence in block 805 with an application calling an API in a framework. The application may provide an ANN dataset and input dataset to the API.

In block 810, the method 800 may include the API calling a neural network API to load the ANN dataset to an electronic board.

In block 815, the method 800 may include the neural network API loading the ANN dataset on the electronic board.

In block 820, the method 800 may include the neural network API keeping an address at which the ANN dataset is stored in the electronic board as a reference for the ANN dataset.

In block 825, the method 800 may include upon receiving the input dataset by the neural network API retrieving the address associated with the ANN dataset.

In block 830, the method 800 may include the neural network API setting the address associated with the ANN dataset as a base address in the electronic board. As shown in FIG. 7, the electronic board may include one or more configuration register(s) 730 for keeping the base address. The memory controller 720 may use the base address to determine location in the memory the electronic board to read and write ANN dataset.

In block 830, the method 800 may include the electronic board performing ANN computations using the input dataset and the ANN dataset referenced by the base address. The input dataset can be loaded to the electronic board prior to performing the ANN computations. After finishing the ANN computations, the input dataset can be removed from the memory of the electronic board. The ANN dataset can be kept in the memory of the electronic board for performing further ANN computations for further input datasets by repeating operations of method 800 in blocks 825-835. The ANN dataset can be kept in the memory of electronic board until the neural network API receives an indication to remove the ANN dataset from the memory of the electronic board.

Figure 9:
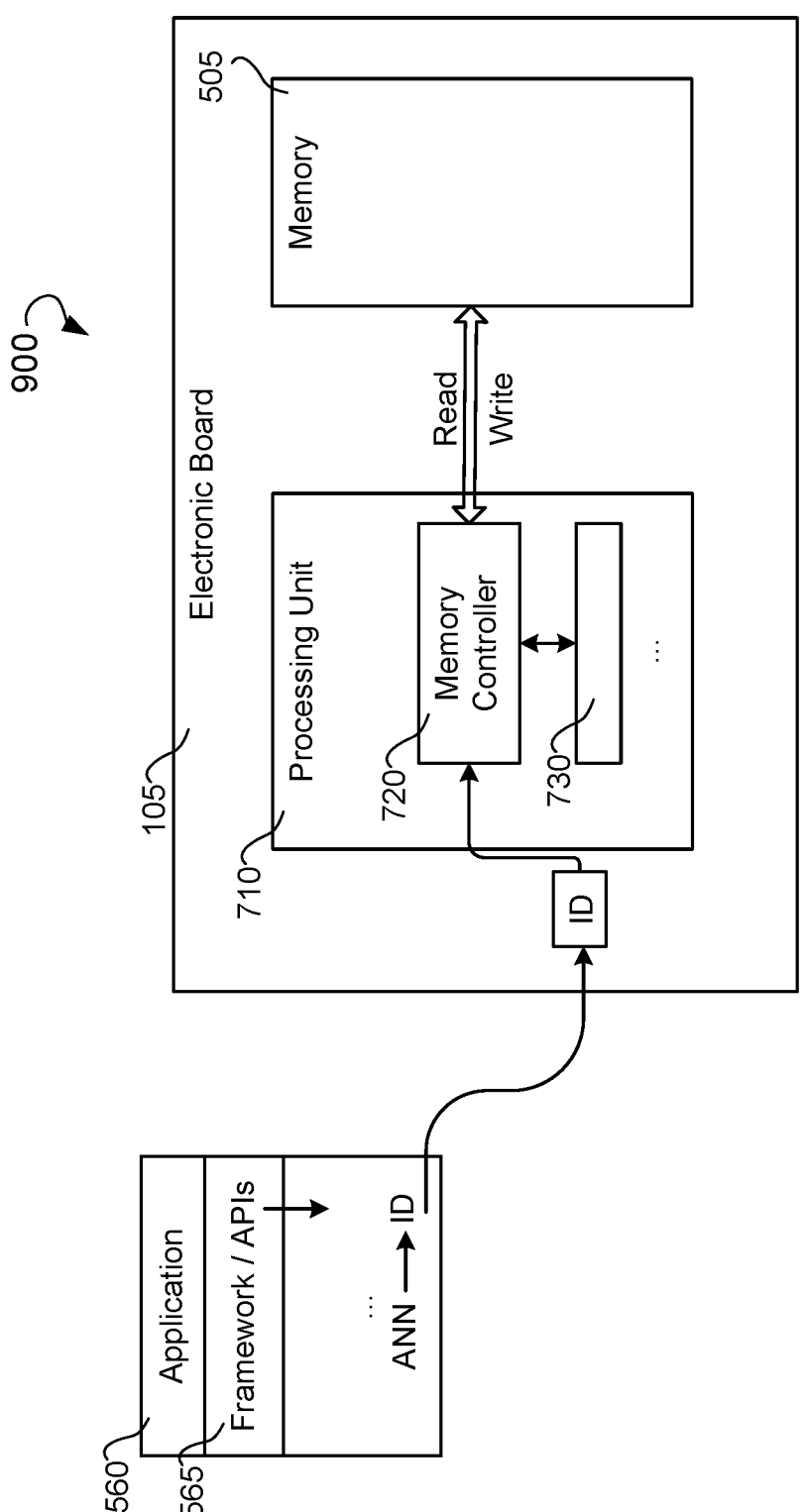
FIG. 9 is a block diagram showing an example system suitable for performing multiple locally stored ANN computations, according to some other embodiments.

FIG. 9 is a block diagram showing example system 900 suitable for performing multiple locally stored ANN computations, according to some other embodiments. The system 900 may include an application 560, a framework 565, and an electronic board 105. The electronic board 105 may include a memory 505 and a processing unit 710. The framework 565 may include software libraries implementing one or more APIs. The electronic board 105 may include a memory controller 720 and one or more configuration register(s) 730. In comparison to system 700 of FIG. 7, an ANN can be referenced by a unique identifier, rather than by a base address in the memory of the electronic board.

FIG. 10 is a flow chart of an example method 1000 for performing multiple locally stored ANN computations, according to some example embodiments. The method 1000 can be implemented by the system 900 of FIG. 9.

The method 1000, may commence, in block 1005, with an application calling an API in a framework. The application may provide an ANN dataset and input dataset to the API.

In block 1010, the method 1000 may include the API calling a neural network API to process the ANN dataset and the input dataset.

In block 1015, the method 1000 may include the neural network API calculating a unique identifier for the ANN dataset. The ANN dataset can include a description of the structures of neurons of an ANN, weights for connections between the neurons, and other parameters of the ANN.

In block 1020, the method 1000 may include determining whether the unique identifier is present on the electronic board. If the unique identifier is present on the electronic board, this may indicate that the ANN dataset has been previously stored in the memory of the electronic board. The method 1000 may further proceed, in block 1025, with enabling the ANN dataset on the electronic board. As shown in FIG. 9, the memory controller 720 of the electronic board 105 may determine, based on the unique identifier, a base address at which the corresponding ANN dataset is stored in the memory 505 of the electronic board. One of the configuration registers 730 can be set to the base address. The memory controller 720 may further read the ANN dataset form the memory 505.

If the unique number is not present on the electronic board, the method 1000 may proceed, in block 1030, with the neural network API loading the ANN dataset on the electronic board. Optionally, the method 1000 may include removing one or more previously loaded ANN datasets from the memory of the electronic board.

In block 1035, the method 1000 may include the electronic board performing ANN computations based on the ANN dataset and the input dataset. The neural network API may load the input dataset to the electronic board prior to the ANN computations and remove the input dataset after the ANN computations are finished. The ANN dataset may be kept in the memory of the electronic board for further ANN computations.

In various embodiments, multiple applications may request, via a framework and APIs, computations for multiple ANNs on the same electronic board. The datasets of the ANNs can be preloaded on the electronic board. Applications may request pausing the computations of an ANN. In this case, the dataset for the ANN may be kept in the memory of the electronic board inactive.

Applications may request resuming the computation of ANN. In this case, a neural network API may reset a base address of the ANN dataset in a configuration register(s) of the electronic board or provide a unique identifier to the memory controller of the electronic board. The memory controller may reset, based on the unique identifier, the base address of the ANN dataset in the configuration register(s) of the electronic board.

If a neural network API receives requests for computations of two and more ANNs, then the API may process the requests sequentially, by computing one ANN on the electronic board at a time. The order of processing the requests can be based on a "first in first out" queue. The order of processing the requests can be based on priorities associated with the ANNs.

In some embodiments, each layer of an ANN can be loaded to the electronic board separately. Layers of the ANN can be assigned different base addresses and different unique identifiers. During ANN computation, different layers of the ANN can be preloaded and kept in the memory of the electronic board at different addresses. Correspondingly, different layers of the ANN can be removed from the memory of the electronic board separately when required.

Figure 11B:
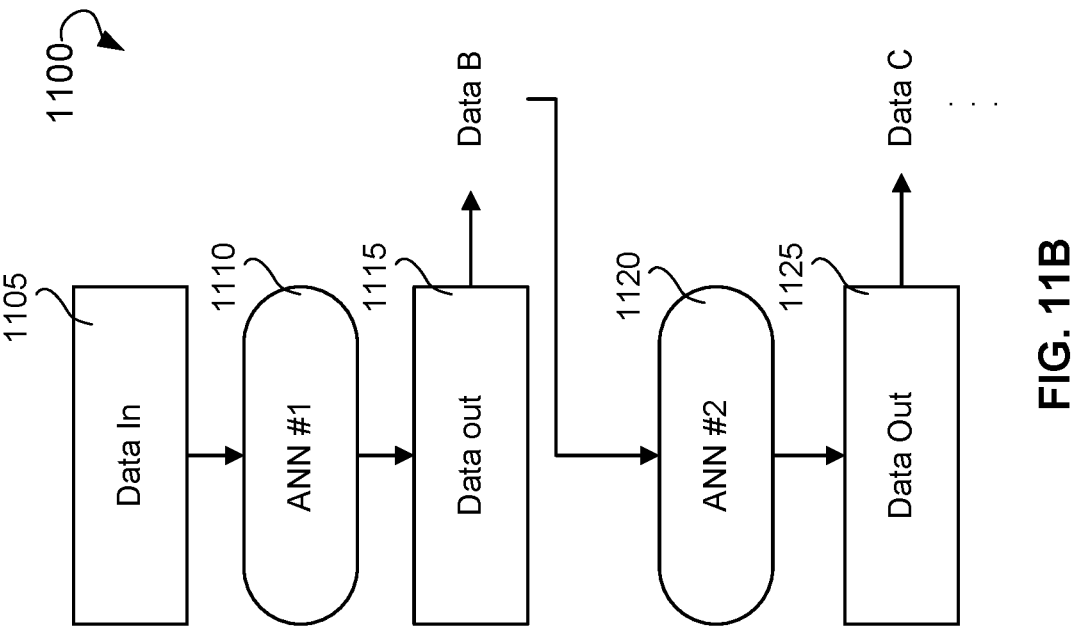
FIG. 11B is a flow chart of example multiple ANN computations.
Figure 11A:
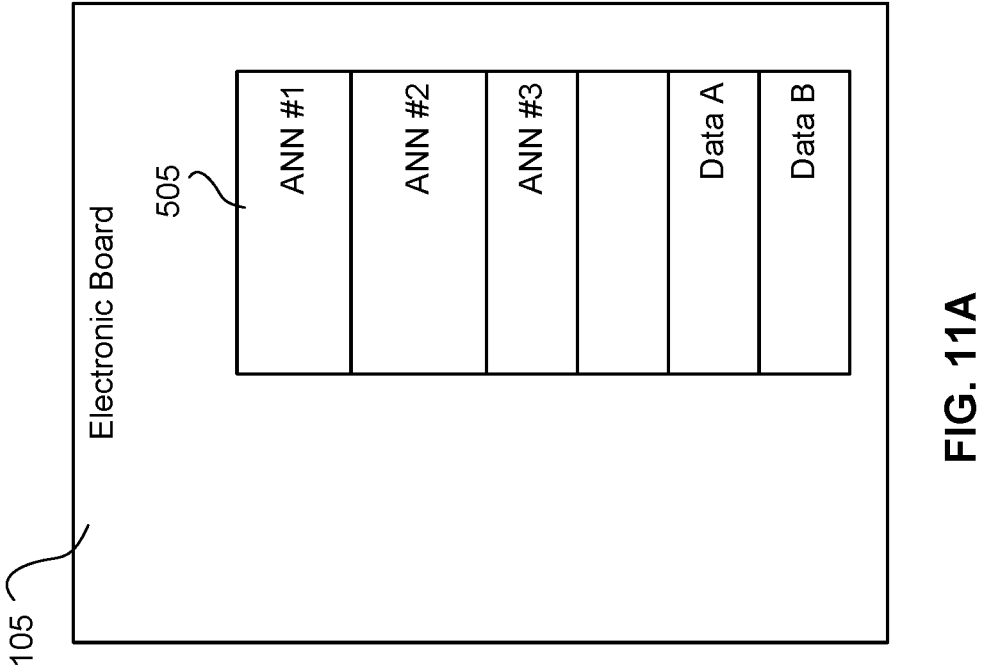
FIG. 11A is a block diagram showing a memory of an electronic board being used for multiple ANN computations, according to an example embodiment.

FIG. 11A is a block diagram showing a memory 505 of an electronic board 105 being used for multiple ANN computations, according to an example embodiment. In the example of FIG. 11A, the memory 505 of the FPGA may also be used to keep both ANN datasets and input datasets for one or more ANNs. Similar to the ANN datasets, the input datasets can be referenced by base addresses or unique identifiers. The same input dataset can be reused in computations with different ANN datasets (for example, a single image can be processed by different ANNs). If the input data dataset is to be processed with multiple ANNs, the input dataset can be loaded to the memory of the electronic board only one time and kept in the memory after being processed by the first ANN. In example of FIG. 11A, the memory 505 is used to keep datasets of ANN #1, ANN #2, and ANN #3 and input datasets Data A and Data B.

FIG. 11B is a flow chart 1100 of example multiple ANN computations, according to an example embodiment. The ANN computations can be performed on the electronic board 105 of FIG. 11A. The ANN computations are performed for ANN datasets and input data stored in the memory 505 shown in FIG. 11A. The ANN computations may commence, in block 1105, with loading datasets for ANN #1, ANN #2, and ANN #3 and input dataset Data A in the memory 505.

In block 1110, the electronic board 105 may be configured to perform ANN computations using the dataset of ANN #1 and the input dataset Data A. The electronic board 105 may include a memory controller and configuration registers to store a base address of the dataset of ANN #1 and a further configuration register to store a base address of the input dataset Data A. Prior to ANN computations, the base address for the dataset of ANN #1 and the base address of the input dataset Data A can be provided to the electronic board to identify which ANN dataset and input dataset stored in memory 505 is to be used in the ANN computations. Alternatively, a unique identifier of the dataset of ANN #1 and a unique identifier of the input dataset Data A can be provided to the electronic board. The electronic board can be further configured to determine, based on the unique identifiers, the base address of the dataset ANN #1 and the base address of the input dataset and store the base address of the dataset ANN #1 and the base address of the input dataset in the configuration registers. The memory controller of the electronic board may further use the bases addresses to access the dataset ANN #1 and the input dataset Data A in memory 505.

In block 1115, the ANN computations may include outputting Data B, by the electronic board 105, a result of computation with dataset of ANN #1 and the input dataset A. The dataset A and dataset B can be kept in the memory 505 for further ANN computations.

In block 1120, the electronic board 105 may be configured to perform ANN computations using the dataset of ANN #2 and the input dataset Data B. Prior to ANN computations, a base address of the ANN #2 can be stored in configuration register.

In block 1125, the ANN computations may include outputting, by the electronic board 105, results of the computation with the dataset of ANN #2 and the input dataset B. The result of the ANN computations can be stored in memory 505 to be reused in further ANN computations as an input dataset Data C.

As described above with connection to FIG. 7, FIG. 8, FIG. 9, and FIG. 10, the electronic board 105 is configured to perform ANN computations via an external neural network API. A decision on which ANN dataset and input dataset to be processed next can be made by the neural network API. In some embodiments, the decision can be made based on results of one or more previous ANN computations performed on the same electronic board. Because the decision is made by an external application, the external application needs to read the result of the previous ANN computation from the memory of the electronic board, determine the base addresses or unique identifiers of the next ANN dataset and next input dataset to be processed by the electronic board, and send the base addresses or the unique identifiers to the electronic board. This approach may not be efficient because all information for making the decision is already present on the electronic board and the decision can be made internally on the electronic board.

Figure 12B:
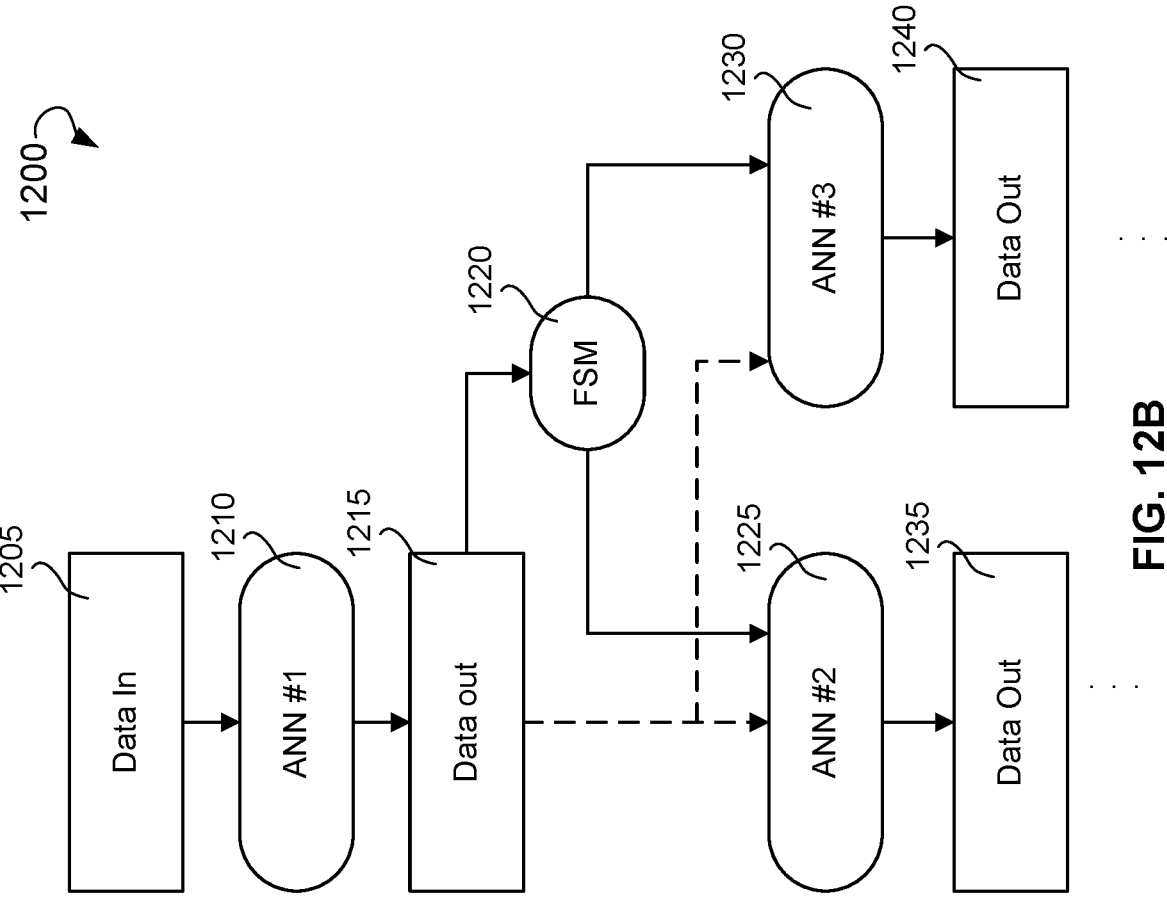
FIG. 12B is a flow chart of example multiple ANN computations.
Figure 12A:
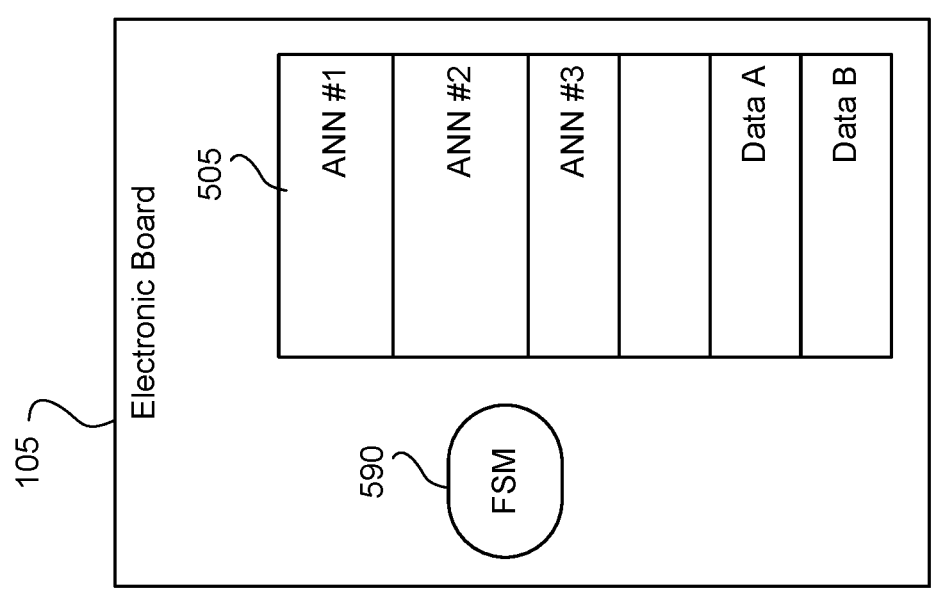
FIG. 12A is block diagram showing an electronic board, according to some example embodiments.

FIG. 12A is block diagram showing an electronic board 105, according to some example embodiments. The electronic board 105 may include memory 505 and a programmable block 590. The programmable block 590 may include an instruction unit or programmable logic. The programmable block 590 may include input-output relations for the ANN dataset and input datasets stored in the memory of the electronic board 105. The programmable block 590 may also include instructions, such as decision blocks configured to select the next ANN dataset and the next input dataset to be processed by the electronic board 105. The selection can be carried out by storing corresponding base addresses in configuration registers for the memory controller of the electronic board. In some embodiments, the instructions stored in the programmable block 590 can be in a form similar to a "finite state machine" (FSM). In some other embodiments, the instructions stored in the programmable block 590 can be structured as a set of instructions in assembly language.

FIG. 12B is a flow chart 1200 of example multiple ANN computations. The ANN computations can be performed by an electronic board 105 shown in FIG. 12A. The ANN computations may commence, in block 1205, with loading datasets for ANN #1, ANN #2, and ANN #3 and input dataset Data A in the memory 505 and configuring the programmable block 590 via, for example, a software API.

In block 1210, the electronic board 105 may be configured to perform ANN computations using the dataset of ANN #1 and the input dataset Data A.

In block 1215, the ANN computations may include outputting, by the electronic board 105, results of computations with dataset of ANN #1 and the input dataset A. The result of computations can be kept in the memory 505 as Data B for further ANN computations.

In block 1220, the programmable block 590 may select, based on the results of the previous ANN computations in block 1210, either the dataset of ANN #2 or the dataset of ANN #3 to perform further ANN computations. The programmable block 590 may also select an input dataset to be used with either the dataset of ANN #2 or the dataset of ANN #3.

If the programmable block 590 selects ANN #2, then, in block 1225, the electronic board 105 may be configured to perform ANN computations using the dataset of ANN #2. In block 1235, the electronic board 105 may output results of computation of the ANN #2. If the programmable block 590 selects ANN #3, then, in block 1230, the electronic board 105 may be configured to perform ANN computations using the dataset of ANN #3. In block 1240, the electronic board 105 may output results of computation of the ANN #3. The results of computations of ANN #2 or ANN #3 can be kept in memory 505 for further ANN computations and can be used by the programmable block 590 to select further ANN datasets and input datasets. In further embodiments (not shown in FIG. 12B), the programmable block 590 can select, iteratively, ANN #2 or ANN #3 to be computed multiple times. At each subsequent iteration, input of the ANN #2 or ANN #3 may include results of computations of ANN #2 or ANN #3 (or other ANNs) generated by previous iterations.

FIG. 13 is a block diagram showing a method 1300 for performing multiple locally stored ANN computations, according to some example embodiments. The method 1300 may be performed by the system 100 described above with reference to FIG. 1.

The method 1300 may commence, in block 1305, with one or more processing units receiving an ANN dataset associated with at least one ANN of a plurality of ANNs.

In block 1310, the method 1300 may include the processing units determining a base address for the ANN, wherein the base address is to be used to locate the ANN dataset in a memory coupled to the one or more processing units.

In block 1315, the method 1300 may include the processing units storing the ANN dataset in the memory at the determined base address.

In block 1320, the method 1300 may include the processing units keeping the ANN dataset in the memory until receiving an indication to remove the ANN dataset from the memory.

FIG. 14 illustrates an example computing system 1400 that may be used to implement embodiments described herein. The example computing system 1400 of FIG. 14 may include one or more processors 1410 and memory 1420. Memory 1420 may store, in part, instructions and data for execution by the one or more processors 1410. Memory 1420 can store the executable code when the exemplary computing system 1400 is in operation. The processor 1410 may include internal accelerators like a GPU, a FPGA, or similar accelerators that may be suitable for use with embodiments described herein. The memory 1420 may include internal accelerators like a GPU, a FPGA, or similar accelerators that may be suitable for use with embodiments described herein. The example computing system 1400 of FIG. 14 may further include a mass storage 1430, portable storage 1440, one or more output devices 1450, one or more input devices 1460, a network interface 1470, and one or more peripheral devices 1480.

The components shown in FIG. 14 are depicted as being connected via a single bus 1490. The components may be connected through one or more data transport means. The one or more processors 1410 and memory 1420 may be connected via a local microprocessor bus, and the mass storage 1430, one or more peripheral devices 1480, portable storage 1440, and network interface 1470 may be connected via one or more input/output buses.

Mass storage 1430, which may be implemented with a magnetic disk drive, an optical disk drive, or a solid state drive (SSD), is a non-volatile storage device for storing data and instructions for use by a magnetic disk, an optical disk drive, or SSD, which in turn may be used by one or more processors 1410. Mass storage 1430 can store the system software for implementing embodiments described herein for purposes of loading that software into memory 1420. The mass storage 1430 may also include internal accelerators like a GPU, a FPGA, or similar accelerators that may be suitable for use with embodiments described herein.

Portable storage 1440 may operate in conjunction with a portable non-volatile storage medium, such as a compact disk (CD) or digital video disc (DVD), to input and output data and code to and from the computing system 1400 of FIG. 14. The system software for implementing embodiments described herein may be stored on such a portable medium and input to the computing system 1400 via the portable storage 1440.

One or more input devices 1460 provide a portion of a user interface. The one or more input devices 1460 may include an alphanumeric keypad, such as a keyboard, for inputting alphanumeric and other information, or a pointing device, such as a mouse, a trackball, a stylus, or cursor direction keys. Additionally, the computing system 1400 as shown in FIG. 14 includes one or more output devices 1450. Suitable one or more output devices 1450 include speakers, printers, network interfaces, and monitors.

Network interface 1470 can be utilized to communicate with external devices, external computing devices, servers, and networked systems via one or more communications networks such as one or more wired, wireless, or optical networks including, for example, the Internet, intranet, LAN, WAN, cellular phone networks (e.g., Global System for Mobile communications network, packet switching communications network, circuit switching communications network), Bluetooth radio, and an IEEE 802.11-based radio frequency network, among others. Network interface 1470 may be a network interface card, such as an Ethernet card, optical transceiver, radio frequency transceiver, or any other type of device that can send and receive information. Other examples of such network interfaces may include Bluetooth®, 3G, 4G, and WiFi® radios in mobile computing devices as well as a USB.

One or more peripheral devices 1480 may include any type of computer support device to add additional functionality to the computing system. The one or more peripheral devices 1480 may include a modem or a router.

The example computing system 1400 of FIG. 14 may also include one or more accelerator devices 1485. The accelerator devices 1485 may include PCIe-form-factor boards or storage-form-factor boards, or any electronic board equipped with a specific electronic component like a GPU, a Neural Processing Unit, a Multi-CPU component, a FPGA component, or similar accelerating electronic or photonic components, that may be suitable for use with embodiments described herein.

The components contained in the exemplary computing system 1400 of FIG. 14 are those typically found in computing systems that may be suitable for use with embodiments described herein and are intended to represent a broad category of such computer components that are well known in the art. Thus, the exemplary computing system 1400 of FIG. 14 can be a personal computer, handheld computing device, telephone, mobile computing device, workstation, server, minicomputer, mainframe computer, or any other computing device. The computer can also include different bus configurations, networked platforms, multi-processor platforms, and so forth. Various operating systems (OS) can be used including UNIX, Linux, Windows, Macintosh OS, Palm OS, and other suitable operating systems.

Some of the above-described functions may be composed of instructions that are stored on storage media (e.g., computer-readable medium). The instructions may be retrieved and executed by the processor. Some examples of storage media are memory devices, tapes, disks, and the like. The instructions are operational when executed by the processor to direct the processor to operate in accord with the example embodiments. Those skilled in the art are familiar with instructions, processor(s), and storage media.

It is noteworthy that any hardware platform suitable for performing the processing described herein is suitable for use with the example embodiments. The terms "computer-readable storage medium" and "computer-readable storage media" as used herein refer to any medium or media that participate in providing instructions to a CPU for execution. Such media can take many forms, including, but not limited to, non-volatile media, volatile media, and transmission media. Non-volatile media include, for example, optical or magnetic disks, such as a fixed disk. Volatile media include dynamic memory, such as RAM. Transmission media include coaxial cables, copper wire, and fiber optics, among others, including the wires that include one embodiment of a bus. Transmission media can also take the form of acoustic or light waves, such as those generated during radio frequency and infrared data communications. Common forms of computer-readable media include, for example, a floppy disk, a flexible disk, a hard disk, magnetic tape, any other magnetic medium, SSD, a CD-read-only memory (ROM) disk, DVD, any other optical medium, any other physical medium with patterns of marks or holes, a RAM, a PROM, an EPROM, an EEPROM, a FLASHEPROM, any other memory chip or cartridge, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU. The instructions or data may not be used by the CPU but be accessed in writing or reading from the other devices without having the CPU directing them.

Thus, systems and methods for accelerating ANN computations are described. Although embodiments have been described with reference to specific exemplary embodiments, it will be evident that various modifications and changes can be made to these exemplary embodiments without departing from the broader spirit and scope of the present application. Accordingly, the specification and drawings are to be regarded in an illustrative rather than a restrictive sense.

What is claimed is:

1. A system comprising:

a memory configured to store artificial neural network (ANN) datasets associated with a plurality of ANNs; and an electronic circuit configured to process solely one ANN dataset selected from the ANN datasets at a time;

wherein the electronic circuit is configured to:

receive, from an application programming interface (API), a first ANN dataset associated with a first ANN of the plurality of ANNs;

store the first ANN dataset in the memory at a first base address;

receive, from the API, an identifier for a second ANN dataset, the identifier being calculated by the API;

determine, based on the identifier, whether the identifier is present in the memory;

in response to the determination that the identifier is not present in the memory:

cause the API to load the second ANN dataset into the memory, the second ANN dataset being associated with a second ANN of the plurality of ANNs; and store the second ANN dataset in the memory at a second base address; and while the first ANN dataset and the second ANN dataset are stored in the memory:

receive, from the API, a first input dataset and the first base address;

based on the first base address, locate, in the memory, the first ANN dataset;

perform a first ANN computation based on the first ANN dataset and the first input dataset;

select, from the plurality of ANNs and based on a result of the first ANN computation, the second ANN dataset for performing a second ANN computation;

receive, from the API, a second input dataset and the second base address;

based on the second base address, locate, in the memory, the second ANN dataset; and perform the second ANN computation based on the second ANN dataset and the second input dataset, the first ANN computation and the second ANN computation being carried out using a same computational block of the electronic circuit.

2. The system of claim 1, wherein the storing of the first ANN dataset in the memory is controlled by a first process and the first ANN computation is controlled by a second process, the first process being different from the second process.

3. The system of claim 2, wherein after ending the first process, the first ANN dataset is kept in the memory.

4. The system of claim 1, wherein the electronic circuit is configured to receive an indication to remove the first ANN dataset from the memory.

5. The system of claim 1, wherein the electronic circuit is configured to:

receive, from the API, priorities associated with the first ANN dataset and the second ANN dataset; and perform the first ANN computation using the first ANN dataset and the second ANN computation using the second ANN dataset in a sequence based on the priorities.

6. The system of claim 1, wherein:

the first ANN dataset includes a first layer data associated with a first layer of the first ANN and a second layer data associated with a second layer of the first ANN; and the electronic circuit is configured to:

keep the first layer data in the memory until receiving a first indication to remove the first layer data from the memory; and keep the second layer data in the memory until receiving a second indication to remove the second layer data from the memory, wherein the first indication differs from the second indication.

7. The system of claim 1, wherein the electronic circuit is further configured to:

store the result of the first ANN computation in the memory; and receive, from the API, the second base address of the second ANN dataset and an instruction to perform the second ANN computation using the result of the first ANN computation for the first input dataset.

8. The system of claim 1, wherein the electronic circuit is configured to:

receive, from the API, a unique identifier of the first ANN dataset instead of the first base address;

associate the unique identifier with the first base address; and keep the unique identifier in the memory while the first ANN dataset is not removed from the memory.

9. The system of claim 8, wherein the unique identifier is determined based on the first ANN dataset, the first ANN dataset including a description of operations included in the first ANN and weights parameters associated with connections of the first ANN.

10. The system of claim 8, wherein the electronic circuit is configured to receive, from the API, the first input dataset and the unique identifier;

determine, based on the unique identifier, the first base address for the first ANN dataset in the memory, the first ANN dataset being associated with the unique identifier; and perform the first ANN computation using the first ANN dataset and the first input dataset.

11. The system of claim 8, wherein the electronic circuit is configured to:

receive, from the API, the unique identifier and an instruction to remove the first ANN dataset; and remove, from the memory, information of the association between the unique identifier and the first base address and, thereby, remove the first ANN dataset from the memory.

12. The system of claim 1, wherein the electronic circuit is further configured to:

associate an input base address with the second input dataset, wherein the input base address is to be used to locate the second input dataset in the memory; and keep the second input dataset in the memory until receiving an indication to remove the second input dataset.

13. The system of claim 12, wherein the second input dataset is to be used for a third ANN computation of one or more other ANNs of the plurality of ANNs.

14. The system of claim 12, wherein the electronic circuit is configured to:

receive, from the API, the first base address and the input base address;

determine, based on the first base address, a location of the first ANN dataset in the memory;

determine, based on the input base address, a location of the second input dataset in the memory; and perform the first ANN computation using the first ANN dataset and the second input dataset.

15. The system of claim 1, wherein the electronic circuit and the memory are integrated into an electronic board configured to perform computations of two or more ANNs of the plurality of ANNs.

16. The system of claim 15, wherein the electronic circuit includes at least one field programmable gate array.

17. A method comprising:

receiving, from an application programming interface (API) by an electronic circuit configured to process solely one artificial neural network (ANN) dataset selected from ANN datasets associated with a plurality of ANNs at a time, a first ANN dataset associated with a first ANN of the plurality of ANNs;

determining, by the electronic circuit, a first base address for the first ANN, wherein the first base address is to be used to locate the first ANN dataset in a memory coupled to the electronic circuit;

storing, by the electronic circuit, the first ANN dataset in the memory at the first base address;

receiving, by the electronic circuit, an identifier for a second ANN dataset from the API, the identifier being calculated by the API;

determining, by the electronic circuit and based on the identifier, whether the identifier is present in the memory;

in response to the determination that the identifier is not present in the memory:

causing the API to load the second ANN dataset into the memory, the second ANN dataset being associated with a second ANN of the plurality of ANNs; and storing, by the electronic circuit, the second ANN dataset in the memory at a second base address; and wherein while the first ANN dataset and the second ANN dataset are stored in the memory, the electronic circuit is configured to:

receive, from the API, a first input dataset and the first base address;

based on the first base address, locate, in the memory, the first ANN dataset;

perform a first ANN computation based on the first ANN dataset and the first input dataset;

select, from the plurality of ANNs and based on a result of the first ANN computation, the second ANN dataset for performing a second ANN computation;

receive, from the API, a second input dataset and the second base address;

based on the second base address, locate, in the memory, the second ANN dataset; and perform the second ANN computation based on the second ANN dataset and the second input dataset, the first ANN computation and the second ANN computation being carried out using a same computational block of the electronic circuit.

18. The method of claim 17, wherein the storing of the first ANN dataset in the memory is controlled by a first process and the first ANN computation is controlled by a second process, the first process being different from the second process.

19. A system comprising:

a memory configured to store artificial neural network (ANN) datasets associated with a plurality of ANNs; and an electronic circuit configured to process solely one ANN dataset selected from the ANN datasets at a time; and wherein the electronic circuit is configured to:

receive, from an application programming interface (API), one or more ANN datasets and one or more input datasets associated with one or more ANNs of the plurality of ANNs, each of the one or more ANN datasets including a description of a structure parameters of at least one ANN of the plurality of ANNs;

store the one or more ANN datasets and the one or more input datasets in the memory;

associate one or more base addresses with the one or more ANN datasets, wherein the one or more base addresses are to be used to locate the one or more ANN datasets in the memory;

associate one or more input base addresses with the one or more input datasets, wherein the one or more input base addresses are to be used to locate the one or more input datasets in the memory;

receive, from the API, a computational model, the computational model including relations between the one or more base addresses and the one or more input base addresses; and perform, based on the computational model, one or more ANN computations; wherein:

the one or more ANN datasets include a first ANN dataset and a second ANN dataset; and the first ANN dataset is stored in the memory at a first base address, the first ANN dataset being associated with a first ANN of the plurality of ANNs; and the electronic circuit is configured to:

receive, from the API, an identifier for the second ANN dataset, the identifier being calculated by the API;

determine, based on the identifier, whether the identifier is present in the memory;

in response to the determination that the identifier is not present in the memory:

cause the API to load the second ANN dataset into the memory, the second ANN dataset being associated with a second ANN of the plurality of ANNs; and store the second ANN dataset in the memory at a second base address; and while the first ANN dataset and the second ANN dataset are stored in the memory:

receive, from the API, a first input dataset and the first base address;

based on the first base address, locate, in the memory, the first ANN dataset;

perform a first ANN computation based on the first ANN dataset and the first input dataset;

select, from the plurality of ANNs and based on a result of the first ANN computation, the second ANN dataset for performing a second ANN computation;

receive, from the API, a second input dataset and the second base address;

based on the second base address, locate, in the memory, the second ANN dataset; and perform the second ANN computation based on the second ANN dataset and the second input dataset, the first ANN computation and the second ANN computation being carried out using a same computational block of the electronic circuit.

20. The system of claim 19, wherein the storing of the first ANN dataset in the memory is controlled by a first process and the first ANN computation is controlled by a second process, the first process being different from the second process.

\* \* \* \* \*